United States Patent [19]

Mitsuji et al.

[11] Patent Number: 5,130,167
[45] Date of Patent: Jul. 14, 1992

[54] TWO-COAT, ONE-BAKE COATING METHOD USING AQUEOUS BASE COAT

[75] Inventors: Masaru Mitsuji, Zama; Akira Kasari, Hiratsuka; Nobuyuki Kawasaki, Yokohama, all of Japan

[73] Assignee: Kansai Paint Company, Limited, Amagasaki, Japan

[21] Appl. No.: 552,388

[22] Filed: Jul. 13, 1990

[30] Foreign Application Priority Data

Aug. 7, 1989 [JP] Japan .................................. 1-204454

[51] Int. Cl.$^5$ .............................................. B05D 1/36
[52] U.S. Cl. .................................. 427/407.1; 427/409; 427/419.8; 427/410
[58] Field of Search .................. 427/419.8, 419.1, 410, 427/407.1, 409, 421, 386, 387, 388.1

[56] References Cited

U.S. PATENT DOCUMENTS

| Re. 31,543 | 3/1984 | Bank et al. | 528/16 |
| 4,082,719 | 4/1978 | Liles et al. | 528/34 |
| 4,403,003 | 9/1983 | Backhouse | 427/407.1 |
| 4,539,232 | 9/1985 | Burzynski et al. | 427/407 |
| 4,603,064 | 7/1987 | Kania | 427/410 |
| 4,754,014 | 6/1988 | Ryntz et al. | 525/477 |
| 4,804,732 | 2/1989 | Ryntz et al. | 525/474 |
| 4,900,774 | 2/1990 | Mitsuji et al. | 524/512 |
| 4,948,829 | 8/1990 | Mitsuji et al. | 524/457 |
| 4,972,027 | 11/1990 | Isozaki et al. | 525/286 |
| 4,994,327 | 2/1991 | Kato et al. | 428/447 |
| 5,051,473 | 9/1991 | Tabuchi et al. | 525/479 |

*Primary Examiner*—Michael Lusignan
*Assistant Examiner*—Diana L. Dudash
*Attorney, Agent, or Firm*—Armstrong & Kubovcik

[57] ABSTRACT

Disclosed is a coating method comprising the steps of applying a base coat composition to a substrate, applying a clear coating composition to the coated surface while the applied base coat composition is still uncured and curing the two coating compositions thus applied at the same time, the method being characterized in that the base coat composition is an aqueous one containing a coloring pigment and that the clear coating composition is a curable one containing a basal resin and a curing catalyst as main components, the basal resin being a resin (Y) having in the molecule hydroxyl group and/or hydrolyzable group both directly attached to the silicon atom, and epoxy group or a resin mixture (Z) of a resin or a compound (Z-1) having hydroxyl group and/or hydrolyzable group both directly attached to the silicon atom and a resin (Z-2) having epoxy group.

5 Claims, No Drawings

TWO-COAT, ONE-BAKE COATING METHOD USING AQUEOUS BASE COAT

BACKGROUND OF THE INVENTION

The present invention relates to a novel coating method according to a two-coat one-bake coating system.

Heretofore the body panels of motor vehicles, two-wheel vehicles, electrical appliances, etc. which must have good appearance have been coated for finish with an organic solvent-diluted thermosetting top coat composition capable of forming a finish film excellent in surface smoothness, distinctness-of-image gloss, weatherability and the like. The two-coat one-bake coating system or method (hereinafter referred to as "2ClB method") has been generally employed to form such finish film. According to the 2ClB method, a substrate is usually coated with an organic solvent-diluted thermosetting enamel base coat composition containing a coloring pigment and/or metallic pigment, and an organic solvent-diluted thermosetting clear top coat composition is applied to the air-dried but uncured base coat, followed by curing the two coatings at the same time.

A demand for the improvement in the good appearance of finish film has been increased in recent years. To improve the smoothness of coating surface, measures such as the addition of rheology controlling agents, polishing of intercoats or the like have been attempted. On the other hand, since high solids coating compositions developed as antipollution measures can readily give a thick film and advantageously improve the appearance of coating film, they have been frequently used as clear top coat compositions in combination with the above base coat composition.

However, the aforementioned conventional methods have the drawbacks of increasing the number of coating steps by addition of polishing and unsatisfactorily improving the coating film appearance. Further, conventional base coat compositions contain a large amount of organic solvent, hence undesirable in view of the need for savings in resources, pollution control and the like. High solids base coat compositions alternatively available are limited in reduction of organic solvents and cause the lack of whiteness in finish film when used for a light-colored metallic coating of silver or like color.

An object of the present invention is to provide a novel coating method free of the above drawbacks of the 2ClB method.

Another object of the invention is to provide a novel coating method capable of giving coating films excellent in surface smoothness, gloss, distinctness-of-image gloss and like finishing properties as well as in adhesion, hardness, and resistance to impact, chipping, scuffing, xylol, acids, weather, water and humidity, the coating method being also advantageous in saving resources and alleviating pollution problems.

These and other objects of the invention will become more apparent from the following description.

SUMMARY OF THE INVENTION

According to the present invention, there is provided a coating method comprising the steps of applying a base coat composition to a substrate, applying a clear coating composition to the coated surface while the applied base coat composition is still uncured and curing the two coating compositions thus applied at the same time, the method being characterized in that the base coat composition is an aqueous one containing a coloring pigment and that the clear coating composition is a curable one containing a backbone or basal resin and a curing catalyst as main components, the basal resin being a resin (Y) having in the molecule hydroxyl group and/or hydrolyzable group both directly attached to the silicon atom, and epoxy group or a resin mixture (Z) of a resin or a compound (Z-1) having hydroxyl group and/or hydrolyzable group both directly attached to the silicon atom and a resin (Z-2) having epoxy group.

Our research showed that the aforementioned prior art problems can be overcome by conducting the 2ClB method using the aqueous base coat composition and the above specific clear curable coating composition comprising the specific basal resin and the curing catalyst. Our findings were that the aqueous base coat composition containing a coloring pigment and entirely or substantially free of an organic solvent is useful for saving resources and controlling pollutions and for improving the orientation of aluminum pigment or like scaly metallic pigment and that the above specific clear curable coating composition gives a top coat remarkably improved in surface smoothness, distinctness-of-image gloss, gloss and like aesthetic properties as well as in hardness, resistance to acids, stain, scuffing and weather, etc. The present invention has been accomplished based on these novel findings.

DETAILED DESCRIPTION OF THE PREFERRED EMBODIMENTS

The aqueous base coat composition containing a coloring pigment and the clear coating composition for use in the invention will be described below in greater detail. 1. Aqueous base coat composition containing a coloring pigment This base coat composition is a water-soluble or -dispersible liquid one which is applied as a base coating prior to the application of a clear coating to be described later. The base coat composition contains as main components a basal resin, a crosslinking agent, a coloring pigment and water.

(1) Basal resin: The basal resin for use herein is a basic component which will constitute the base coat after curing. Examples of such resins are acrylic resins, alkyd resins (including polyester resins, hereinafter the same), epoxy resins, fluorine-containing resins, etc. These basal resins are dissolved or dispersed in water for use. Of these resins, acrylic resins are suitable to use.

(i) Water-soluble acrylic resin

Included among such resins is a neutralization product of an acrylic resin prepared by copolymerizing a carboxyl-containing vinyl monomer (M-1), hydroxyl-containing vinyl monomer (M-2) and other vinyl monomers (M-3), the resin having an acid value of about 20 to about 150, a hydroxyl value of about 20 to about 200 and a number-average molecular weight of about 3,000 to about 100,000.

The carboxyl-containing vinyl monomer (M-1) is a compound having at least one carboxyl group and one polymerizable unsaturated bond per molecule, and including, for example, acrylic or methacrylic acid, crotonic acid, maleic acid, maleic anhydride, itaconic acid or the like.

The hydroxyl-containing vinyl monomer (M-2) is a compound having one hydroxyl group and one polymerizable unsaturated bond per molecule wherein the hydroxyl group acts mainly as the functional group reacting with a crosslinking agent. Stated more specifically, suitable examples of such monomer are monoesters of acrylic or methacrylic acid with $C_{2-10}$ dihydric alcohol, e.g. 2-hydroxyethyl acrylate, 2-hydroxyethyl methacrylate, hydroxypropyl acrylate, hydroxypropyl methacrylate, etc.

Usable as other monomers (M-3) are monomers other than the monomers (M-1) and (M-2) and having one polymerizable unsaturated bond per molecule. Specific examples of such monomers are given below.

i) Monoesters of acrylic or methacrylic acid with $C_{1-20}$ monohydric alcohol such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, cyclohexyl acrylate, cyclohexyl methacrylate, lauryl acrylate, lauryl methacrylate, etc.

ii) Aromatic vinyl monomers such as styrene, α-methylstyrene, vinyltoluene, etc.

iii) Glycidyl-containing vinyl monomers: compounds having one glycidyl group and one polymerizable unsaturated bond per molecule such as glycidyl acrylate, glycidyl methacrylate, etc.

iv) Nitrogen-containing alkyl ($C_{1-20}$) acrylate or methacrylate such as dimethylaminoethyl acrylate, dimethylaminoethyl methacrylate, etc.

v) Amide compounds containing polymerizable unsaturated bond such as acrylic amide, methacrylic amide, dimethylacrylamide, N,N-dimethylpropylacrylamide, N-butoxymethylacrylamide, N-methylolacrylamide, N-methylolmethacrylamide, diacetoneacrylamide, etc.

vi) Vinyl compounds such as vinyl acetate, vinyl propionate, vinyl chloride, etc.

vii) Nitrile compounds containing polymerizable unsaturated bond such as acrylonitrile, methacrylonitrile, etc.

viii) Diene compounds such as butadiene, isoprene, etc.

The monomers (M-3) can be used singly or at least two of them can be used in mixture.

These vinyl monomers are copolymerized by conventional methods. For example, the copolymerization reaction is conducted in an organic solvent which is compatible with water, such as butyl cellosolve in the presence of a radical polymerization catalyst such as azobisisobutyronitrile, benzoyl peroxide, dibutyl peroxide, ammonium persulfate, potassium persulfate, sodium pyrosulfite, t-butyl hydroperoxide, cumene hydroperoxide or the like. The radical polymerization catalyst is used in an amount of about 0.1 to about 10 parts by weight, preferably about 0.2 to about 5 parts by weight, per 100 parts by weight of the total vinyl monomers. When the acid value of the resin is less than about 20, the resin is sparingly soluble in water, whereas an acid value of higher than about 150 impairs the coating film properties due to the presence of remaining carboxyl group.

The thus obtained acrylic resin can be made soluble in water by its neutralization with a basic substance.

Examples of useful basic substances are ammonia; ethylamine, propylamine, isopropylamine, butylamine, 2-ethylhexylamine and like primary alkylamines; monoethanolamine, monobutanolamine and like monoalkanolamines; dimethylamine, diethylamine, dipropylamine, diisopropylamine, dibutylamine and like secondary alkylamines; ethylenediamine, propylenediamine and like diamines; methylethanolamine and like monoalkylmonoalkanolamines; dimethylethanolamine, diethylethanolamine and like dialkylmonoalkanolamines; diethanolamine, propanolamine and like dialkanolamines; triethylamine, tributylamine and like trialkylamines; triethanolamine, tributanolamine and like trialkanolamines; potassium hydroxide, sodium hydroxide and like alkali metal hydroxides, etc.

Of these basic substrates, dialkanolamines, especially diethanolamine, are desirable.

(ii) Water-dispersible acrylic resin 1

The acrylic resin 1 is prepared by emulsion polymerization of a vinyl monomer in the presence of a dispersion stabilizer and is in the form of particles dispersed in water and having a mean particle size of about 0.05 to about 1.0 μm.

For use in emulsion polymerization, at least one vinyl monomer is selected from the the examples of the carboxyl-containing vinyl monomer (M-1), hydroxyl-containing vinyl monomer (M-2) and other vinyl monomers (M-3) shown above for the water-soluble acrylic resins. When required, a small amount of polyvinyl compound (M-4) having at least 2 polymerizable unsaturated bonds per molecule is used conjointly with the vinyl monomers to give a water-dispersible acrylic resin having the particles internally crosslinked which results in further improvement of coating film properties, hence desirable.

Usable as a dispersion stabilizer are surfactants and water-soluble resins. Useful surfactants may be anionic or nonionic. Examples of suitable anionic surfactants are alkali metal salts or ammonium salts of long-chain alkylsulfate, long-chain alkylsulfonate or long-chain alkylsulfosuccinate; alkali metal salt of alkyldisulfate; alkali metal salt or ammonium salt of polyoxyethylene alkylphenyl ether sulfate; alkali metal salt or ammonium salt of alkyldiphenyl ether disulfonate; alkali metal salt or ammonium salt of dialkylsulfosuccinate; etc. Examples of suitable nonionic surfactants are polyoxyethylene alkylphenyl ether, polyoxyethylene alkyl ether, polyoxyethylene long-chain carboxylate, etc. Useful water-soluble resins include acrylic resins having an acid value of about 20 to about 150 and a number-average molecular weight of about 5,000 to about 30,000.

The amount of the dispersion stabilizer used is preferably about 0.05 to about 10% by weight, more preferably about 0.1 to about 5% by weight, most preferably bout 0.5 to about 3% by weight, based on the weight of the total monomers.

Examples of the polyvinyl compound (M-4) having at least two polymerizable unsaturated bonds per molecule are ethylene glycol diacrylate, ethylene glycol dimethacrylate, triethylene glycol diacrylate, tetraethylene glycol dimethacrylate, 1,6-hexanediol diacrylate, divinylbenzene, trimethylolpropane triacrylate, etc. Of these examples, preferable are those containing at least two unsaturated bonds which are not widely different in reactivity from each other. The above diene compounds are not included among such compounds.

The neutralizing agent suitable for preparing the water-dispersible acrylic resin 1 is at least one compound selected from the above examples among which dialkanolamines, especially diethanolamine, are optimal.

(iii) Water-dispersible acrylic resin 2

The resin is used in the form of an aqueous dispersion having acrylic resin particles dispersed in water and stabilized by a polymer stabilizer namely in the form of a core/shell emulsion comprising the resin particles as a core and the polymer stabilizer as a shell.

Stated more specifically, the aqueous dispersion of acrylic resin 2 is prepared by emulsion polymerization of a vinyl monomer component entirely or substantially free of carboxyl-containing vinyl monomer (M-1), followed by the addition of a large amount of vinyl monomer component containing a carboxyl-containing vinyl monomer (M-1) which is subjected to emulsion polymerization. The obtained resin is thickened by neutralization with a neutralizing agent, hence favorable in view of the amenability to coating operation. A preferred neutralizing agent is at least one substance selected from the basic substances useful for rendering the acrylic resin (i) soluble in water. More preferable neutralizing agents are dialkanolamines of which diethanolamine is optimal.

Crosslinked resin particles are desirable as the core.

(iv) Water-dispersible acrylic resin 3

The resin 3 is used in the form of a core/shell emulsion comprising crosslinked polymer particles, each particle (core) having a polymer (shell) bonded thereto for stabilizing the core.

A preferred method for bonding together the core and the shell comprises introducing polymerizable unsaturated bond onto the core surface, utilizing hydrolyzable functional group or silanol group present on the core and copolymerizing the unsaturated bond with the vinyl monomer component containing a carboxyl-containing vinyl monomer (M-1) to form a shell, followed by neutralization of carboxyl group of the shell.

The obtained core/shell emulsion is thixotropic and gives a coating substantially free from sagging which would occur on exposure to high shear force or to high humidity. The emulsion containing an organic solvent causes no undesired change. Moreover, the emulsion is capable of forming coating films excellent in surface smoothness, gloss, adhesion, metallic effect, resistance to water, chemicals and weather, physical characteristics, etc.

The core/shell emulsion can be prepared by executing the following steps.

(I) A silane monomer (M-5) having hydrolyzable functional group and/or silanol group and polymerizable unsaturated bond (hereinafter referred to as "silane monomer"), a hydroxyl-containing vinyl monomer (M-2) and other vinyl monomers (M-6) are reacted in an aqueous medium, giving an emulsion containing three-dimensionally crosslinked polymer particles dispersed in water. The polymer particle constitutes the core.

(II) The particulate polymer in the emulsion is reacted with the silane monomer (M-5) and/or an allyl (meth)acrylate (M-7). In this step, presumably the silane monomer (M-5) undergoes condensation reaction with the functional group present on the surface of the polymer particle, while the allyl (meth)acrylate (M-7) is copolymerized with the unreacted polymerizable unsaturated bond remaining in the particulate polymer. The reactions result in the introduction of polymerizable unsaturated bond onto the surface of the polymer particle.

(III) In the emulsion formed by the reactions in the step (II), a vinyl monomer component (M-8) containing a carboxyl-containing vinyl monomer (M-1) is copolymerized, and the carboxyl group is neutralized. The neutralized copolymer is a stabilizer for stabilizing the dispersion of particulate polymer and corresponds to the shell. In the step (III), the vinyl monomer component (M-8) is copolymerized with the polymerizable unsaturated bond formed from the silane monomer (M-5) and/or allyl (meth)acrylate (M-7) on the surface of the particulate polymer by the reactions in the step (II).

Step (I)

The silane monomer (M-5) used in the step (I) is a compound having hydrolyzable functional group and/or silanol group three in total number and one residue having one polymerizable unsaturated bond per molecule, all bonded to Si, the compound being represented by the formula $(R_1)_3—Si—X$ wherein $R_1$ is a hydrolyzable functional group and/or silanol group and X is a residue having polymerizable unsaturated bond. The silane monomer (M-5) is capable of forming a core when internally crosslinked.

Examples of the hydrolyzable functional group represented by $R_1$ in the above formula are alkoxy group having 1 to 12 carbon atoms, alkoxyalkoxy group having 3 to 15 carbon atoms, alkanoyloxy group having 1 to 12 carbon atoms, etc. Examples of the residue represented by X are $CH_2=CH—$, $CH_2=C(R_2)—CO—O—(CH_2)_n—$, etc. (wherein $R_2$ is a hydrogen atom or $CH_3—$, and n is an integer of 2 to 10).

Examples of the silane monomer (M-5) are vinyltrimethoxysilane, vinyltriethoxysilane, acryloxyethyltrimethoxysilane, methacryloxyethyltrimethoxysilane, acryloxypropyltrimethoxysilane, methacryloxypropyltrimethoxysilane, acryloxypropyltriethoxysilane, methacryloxypropyltriethoxysilane, vinyltris($\beta$-methoxyethoxy)-silane, etc. Preferred silane monomers are vinyltrimethoxysilane, $\gamma$-acryloxypropyltrimethoxysilane, $\gamma$-methacryloxypropyltrimethoxysilane, etc.

The hydroxy-containing vinyl monomer (M-2) useful in the step (I) include the examples given above. The term "other vinyl monomer (M-6)" are monomers (M-1), (M-3) and (M-4).

In the step (I), the particulate polymer is prepared by copolymerizing the silane monomer (M-5), the hydroxyl-containing vinyl monomer (M-2) and the vinyl monomer (M-6) in an aqueous medium to give three-dimensionally crosslinked polymer particles. The copolymerization can be done, for example, by conventional emulsion polymerization methods as described below.

(i) A mixture of the above monomers is added dropwise in an atmosphere of inert gas to an aqueous medium being stirred and consisting of water and a surfactant while copolymerizing the monomers at a specific temperature.

(ii) An emulsion of the above monomer mixture dispersed in an aqueous medium is added dropwise to water being stirred while copolymerizing the monomers at a specific temperature.

(iii) A small quantity of monomer or monomers (singly or in mixture) is subjected to seed polymerization and the resulting polymer is subjected to emulsion polymerization by the method (i) or (ii).

Among the foregoing methods, the method (iii) is suitable because it is capable of reducing the particle size and improving the sagging resistance and surface smoothness.

It is preferred to conduct these emulsion polymerizations in the presence of a radical polymerization initiator.

The monomers are used in the steps (I) and (III) in the following proportions. The proportion of total monomers used in the step (I) is about 30 to about 95% by weight, preferably about 60 to about 90% by weight, based on the combined weight of monomers used in the steps (I) and (III). The proportion of total monomers used in the step (II) is about 70 to about 5% by weight, preferably about 40 to about 10% by weight, based on the combined weight of monomers used in the steps (I) and (III).

Used in the step (I) are the silane monomer (M-5), the hydroxyl-containing vinyl monomer (M-2) and the other vinyl monomer (M-6), more specifically about 0.5 to about 20% by weight, preferably about 1 to about 10% by weight, of the silane monomer (M-5), about 1 to about 30% by weight, preferably about 2 to about 20% by weight, of the hydroxyl-containing vinyl monomer (M-2) and about 98.5 to about 50% by weight, preferably about 97 to about 70% by weight, of the other vinyl monomer (M-6), based on the combined weight of these monomers.

The monomer component (M-8) used in the step (III) contains the carboxyl-containing vinyl monomer (M-1) in an amount of about 1 to about 50% by weight, preferably about 3 to about 30% by weight, based on the weight of the vinyl monomer component (M-8). The monomer component (M-8) comprises the monomer (M-1), hydroxyl-containing vinyl monomer (M-2) and at least one monomer selected from the monomers i) to viii) exemplified above as the monomer (M-3). The content of the monomer (M-2) in the monomer component (M-8) is preferably up to 30% by weight, more preferably up to 25% by weight, based on the weight of the monomer component (M-8).

The monomer component (M-8) may further contain the silane monomer (M-5) and the polyvinyl compound (M-4). A suitable amount of these monomers is 10% by weight or less, based on the weight of the monomer component (M-8).

The emulsion obtained in the step (I) contains the particulate polymer formed by three-dimensional cross-linkage of monomers (M-5), (M-2) and (M-6) and dispersed in an aqueous medium. The crosslinking reaction of these monomers concurs with the copolymerization of polymerizable unsaturated bonds present in these monomers and the condensation or self-condensation reaction of hydrolyzed or unhydrolyzed functional groups and/or silanol groups in the silane monomer (M-5), occasionally with the reaction of the silane monomer (M-5) with the hydroxyl group present in the hydroxyl-containing vinyl monomer (M-2). The resulting polymer particles are presumably three-dimensionally crosslinked with —C—C bonds formed from polymerizable unsaturated bonds and —Si—O—Si— bonds derived from the silane monomer (M-5). Presumably the hydrolyzable functional group and/or silanol group derived from the silane monomer (M-5) as unreacted are attached to the surface of the polymer particles. Further the hydroxyl group derived from the monomer (M-2) is present on the surface thereof. The particle size of the polymer particles obtained in the step (I) varies according to the kind and amount of the surfactant used and the polymerization method and the like, but usually ranges from about 10 to about 500 nm, preferably about 30 to about 300 nm.

Step (II)

The silane monomer (M-5) and/or an allyl (meth)acrylate (M-7) is reacted with the particulate polymer in the emulsion obtained in the step (I) to introduce the polymerizable unsaturated bond onto the surface of the particulate polymer. The particulate polymer produced in the step (II) which has the polymerizable unsaturated bond introduced thereon is hereinafter referred to as "unsaturated particulate polymer".

The silane monomer (M-5) is reacted with the unreacted hydrolyzable functional group and/or silanol group attached to the surface of the particulate polymer obtained in the step (I) or with the hydroxyl group derived from the vinyl monomer (M-2) to introduce the polymerizable unsaturated bond onto the surface thereof.

Stated more specifically, the silane monomer (M-5) is incorporated into the emulsion produced in the step (I), and the resulting emulsion is left to stand at a temperature of, e.g. about 20° to about 90° C., whereby the silane monomer (M-5) becomes adsorbed onto the surface of the particulate polymer in the emulsion while the foregoing reaction proceeds to introduce the polymerizable unsaturated bond onto the surface thereof.

The ratio of the particulate polymer and the silane monomer (M-5) used in the step (II) is not specifically limited. A preferred amount of the silane monomer (M-5) used in the step (II) is about 0.5 to about 2 moles per mole of the silane monomer (M-5) used in the step (I) (usually about 50 to about 200 parts by weight of the former per 100 parts by weight of the latter). A lesser amount of the former used tends to reduce the amount of polymerizable double bond introduced and to impair the stability of the composition, whereas a larger amount thereof is likely to cause coagulation of the particulate polymer.

Of the allyl double bond and the acrylic double bond present in the monomer (M-7), the latter is more readily polymerizable than the former. When the monomer (M-7) is incorporated into the aqueous dispersion obtained in the step (I) and the dispersion is heated to about 40° to about 90° C., the acrylic double bond in the monomer (M-7) is polymerized with the unreacted monomer present in the particulate polymer of the aqueous dispersion, whereby the less polymerizable allyl double bond presumably remains in an unreacted state on the surface of the particulate polymer. When the monomers (M-7) and (M-5) are conjointly used, the foregoing reactions occur concurrently. A preferred amount of the monomer (M-7) used is about 0.5 to about 5 parts by weight per 100 parts by weight of the particulate polymer. Conjoint use of the monomers (M-5) and (M-7) is preferred and the proportions of the particulate polymer and these monomers are as shown above.

Step (III)

The unsaturated particulate polymer obtained in the step (II) is copolymerized with the vinyl monomer component (M-8) containing a carboxyl-containing vinyl monomer (M-1). Subsequently the carboxyl group is neutralized to form a shell.

The copolymerization reaction of the vinyl monomer component (M-8) is the step (III) can be carried out in the same manner as the above emulsion polymerization method (i) or (ii). For this copolymerization, the vinyl monomer component (M-8) is incorporated into the emulsion of the unsaturated particulate polymer obtained in the step (II) and the mixture is reacted at a temperate of about 50° to about 90° C. It is preferred to conduct this reaction in the presence of the foregoing radical polymerization initiator when so required.

The step (III) is performed to combine chemically the unsaturated particulate polymer (core) obtained in the step (II) with a copolymer (shell), generally a linear copolymer, composed of the vinyl monomer component (M-8). When the silane monomer (M-5) and the polyvinyl compound (M-4) are conjointly used in the step (III), the linear copolymer becomes a reticulate one which can be chemically combined with the particulate polymer. Stated more specifically, the vinyl monomer component is copolymerized with the polymerizable unsaturated bond of the silane monomer (M-5) attached to the surface of the unsaturated particulate polymer obtained in the step (II), and/or the polymerizable unsaturated bond remaining in the allyl (meth)acrylate (M-7) copolymerized with the unreacted monomer remaining in the particulate polymer, whereby the copolymer (shell) of the vinyl monomer component (M-8) is chemically combined with the surface of the particulate polymer (core) obtained in the step (I).

In the step (III), the unsaturated particulate polymer is copolymerized with the vinyl monomer component to form a shell after which the carboxyl group in the shell is neutralized. The neutralization is conducted by the addition of a neutralizing agent to the reaction system. Usable as such neutralizing agents is at least one compound selected from the examples of neutralizing agents for the above (i) water-soluble acrylic resin. Of the exemplified neutralizing agents, preferable are dialkanolamines, especially diethanolamine.

The neutralization reaction is performed at room temperature or at an elevated temperature, whereby a water-dispersible acrylic resin 3 is given.

The particulate polymer eventually obtained in the step (III) comprises the core formed in the step (I) and the shell attached thereto, the shell having been made hydrophilic by neutralization. The obtained particulate polymer has a particle size 10 to 100% larger than the one obtained as the core in the step (I).

(v) Other basal resins i) A water-soluble or -dispersible alkyd resin prepared from a polybasic acid, a polyhydric alcohol, and when required a fatty acid (including oils).

ii) A water-soluble or -dispersible resin which includes an adduct of $\alpha,\beta$-unsaturated acid with unsaturated bond of unsaturated fatty acid-modified epoxy resin, or a water-soluble or -dispersible resin prepared by esterifying a polybasic acid with the hydroxyl group of an esterified epoxy resin.

iii) A resin consisting of the above water-dispersible resin and water-soluble resin in an amount of about 99 to about 60 wt. %, preferably about 95 to about 75 wt. %, of the former and about 1 to about 40 wt. %, preferably about 5 to about 25 wt. %, of the latter, based on the total weight of the two resins in terms of solid content.

The neutralizing agent to be used for the preparation of the resins i) to iii) is preferably at least one agent selected from the examples given above in item (i). Of the examples, dialkanolamines, especially diethanolamine, are suitable.

In the present invention, it is desirable to use the resin selected from the resins (i) to (v) as a basal resin for the aqueous coating composition.

(2) Crosslinking agent

The crosslinking agent useful herein is one having crosslinkable functional group and capable of dissolving or dispersing uniformly in the basal resin and of reacting with the basal resin to form a three-dimensionally crosslinked base coat.

Specific examples of useful crosslinking agents are melamine resin, benzoguanamine resin, urea resin and like amino resins as methylolated, these resins as etherified with alkyl, phenolformaldehyde resin, block polyisocyanate compounds, etc. While a water-soluble or hydrophobic crosslinking agent is usable, a hydrophobic one is preferably used to improve the amenability to coating operation, storage stability, humidity resistance and the like.

Suitable examples of the hydrophobic melamine resin are those having a solvent dilution ratio of up to 20, preferably up to 15, and a weight average molecular weight of about 700 to about 4,000, preferably about 800 to about 3,000. The solvent dilution ratio is an index indicating the solubility of melamine resin in a hydrophilic solvent. The lower the ratio, the more hydrophobic the resin. The solvent dilution ratio is determined by the following method. Two grams of melamine resin is placed into a 50-cc beaker, which is then placed on paper bearing a print of No. 5 type. Subsequently, at 25° C. a solvent mixture of water and methanol (35/65 in weight ratio) is added dropwise to the resin with stirring until the print becomes illegible. The amount (cc) thus added is divided by the amount of the melamine resin to obtain a value (cc/g) as the ratio.

The hydrophobic melamine resin is not limited specifically insofar as it fulfills the solvent dilution ratio and molecular weight requirements. The resin is usable as etherified variously, for example, as modified with at least one of methyl alcohol, ethyl alcohol, isopropyl alcohol, n-butyl alcohol, isobutyl alcohol, octyl alcohol, 2-ethylhexyl alcohol, benzyl alcohol, etc. According to the invention, it is suitable to use the resin as modified with an alcohol having at least four carbon atoms, more preferably four to seven carbon atoms. The amount of ether groups in the melamine resin, although not limited specifically, is suitably about 5 moles or less, preferably about 1.5 to about 3 moles, per triazine ring. Further as to the functional groups such as amino, imino and methylol, the kind and amount of remaining functional groups are not limited specifically provided that the foregoing solvent dilution ratio and molecular weight requirements are satisfied. Usually, however, the amount of imino groups (inclusive of amino groups) as well as of methylol groups is about 0.2 to about 2.0 moles, preferably about 0.5 to about 1.5 moles, per triazine ring.

The hydrophobic crosslinking agent is preferably mixed with a water-soluble resin before blending of components so that the surface of hydrophobic crosslinking agent (usually in a particulate form) is coated with the water-soluble resin to improve the amenability to coating operation (prevention of sagging, etc.), storage stability and the like.

Water-soluble resins useful for this purpose are those having introduced therein a quantity of hydrophilic groups, such as carboxyl (—COOH), hydroxyl (—OH), methylol (—CH$_2$OH), amino (—NH$_2$), sulfone (—SO₃H) or polyoxyethylene bond [―(―CH₂CH₂O―)ₙ―]. Examples of such resins are acrylic resin, alkyd resin, epoxy resin and the like. The most typical of such water-soluble resin is an acrylic resin having carboxyl groups introduced therein, neutralized to an alkali salt and thereby made soluble in water.

Suitable proportions of the hydrophobic crosslinking agent and water-soluble resin are about 20 to about 100 parts by weight, preferably about 28 to about 80 parts by weight, of the latter per 100 parts by weight of the former calculated as solids. The two components can be mixed by any suitable method, for example by mixing together the two components using a dissolver, homomixer or the like to provide a homogeneous blend. When required, a small amount of hydrophilic solvent, such as alcohol solvent or ether solvent, can be added to the mixture in this step. Next, deionized water is added in small portions to the mixture in about 0.5 to about 5 times the combined amount by weight of the hydrophobic crosslinking agent and the water-soluble resin while vigorously stirring the mixture, whereby the crosslinking agent is made into a milky white one or colored aqueous dispersion. The dispersion contains particles about 0.05 to about 0.5 μm in a mean particle size.

The amount of the crosslinking agent used is about 10 to about 50% by weight, preferably about 15 to about 40% by weight, based on the total weight of the agent and the basal resin in terms of solid content.

(3) Coloring pigment: The coloring pigment is used to color the base coat and includes metallic pigments.

Examples of useful metallic pigments are aluminum flake, copper bronze flake, micaceous iron oxide, mica flake, metallic oxide-coated micaceous iron oxide, metallic oxide-coated mica flake, etc. Examples of useful coloring pigments are titanium dioxide, iron oxide, chromium oxide, lead chromate, carbon black and like inorganic pigments; Phthalocyanine Blue, Phthalocyanine Green, Carbazole Violet, Anthrapyrimide Yellow, Flavanthrone Yellow, Isoindoline Yellow, Indanthrone Blue, Quinacridone Violet and like organic pigments.

The aqueous coating composition for use in the present invention is prepared by dispersing the basal resin, crosslinking agent and coloring pigment in water. The aqueous coating composition may contain a defoaming agent, mildewproofing agent, etc. when so required. The aqueous coating composition may further contain an organic solvent.

2. Clear coating composition

The clear coating composition for use herein is applied to the uncured coating surface of base coat composition as described above in item 1 to form a transparent coating film. Stated more specifically, the clear coating composition is a curable one comprising a basal resin and a curing catalyst as main components. The basal resin is a resin (Y) having hydroxyl group and/or hydrolyzable group, both directly attached to the silicon atom and epoxy group, in the molecule or a resin mixture (Z) of a resin or a compound (Z-1) having hydroxyl group and/or hydrolyzable group, both directly attached to the silicon atom, and a resin (Z-2) having epoxy group. 2-1. The resin (Y) and the resin mixture (Z) will be described below.

The hydrolyzable groups attached directly to the silicon atoms in the resin (Y) and in the resin or compound (Z-1) hydrolyze in the presence of water or moisture to form a silanol group. Examples of such hydrolyzable groups include those represented by the formulas

 (1')

 (2')

 (3')

 (4')

 (5')

 (6')

In the foregoing formulas, R' is an alkyl having 1 to 4 carbon atoms, R″, R‴ and R⁗ are the same or different and each represent an alkyl group having 1 to 8 carbon atoms, an aryl group or an aralkyl group. Examples of the C₁₋₈ alkyl group in these formulas are methyl, ethyl, n-propyl, iso-propyl, n-butyl, iso-butyl, sec-butyl, tert-butyl, n-pentyl, iso-pentyl, n-octyl, iso-octyl, etc. Examples of the aryl group are phenyl, toluyl, xylyl, etc. Examples of the aralkyl group are benzyl, phenethyl, etc.

In addition to the hydrolyzable group directly attached to silicon atom, a

group can be used as a hydrolyzable group.

Suitable examples of the silane group in the resin (Y) and the resin or compound (Z-1) as hydroxyl group and/or as hydrolyzable functional group (these groups being hereinafter referred to as "silane group") are the groups of the formulae (1') and (2') in view of the storage stability, curability and the like.

The basal resin will be described below.

Specific examples of the resin (Y) and the resin mixture (Z) useful as the above basal resin are given below in items (1) to (8).

(1) A reaction product (D) prepared by reacting a resin (A) having functional group, a compound (B) having epoxy group and functional group complementarily reactive with the functional group of the resin (A), and a compound (C) having silane group and functional group complementarily reactive with the functional group of the resin (A) (hereinafter referred to as "(1) resin composition").

(2) A mixture of reaction products (F) and (H), the reaction product (F) being obtainable by reacting a resin (E) containing functional group with the compound (B) containing epoxy group and functional group complementarily reactive with the functional group of the resin (E), and the reaction product (H) being obtainable by reacting a resin (G) containing functional group with the compound (C) containing the silane group and functional group complementarily reactive with the functional group of the resin (G) (hereinafter referred to as "(2) resin composition").

(3) A copolymer (L) comprising an epoxy-containing polymerizable unsaturated monomer (J), silane-containing polymerizable unsaturated monomer (K) and when required other polymerizable unsaturated monomers (M) (hereinafter referred to as "(3) resin composition").

(4) A mixture of a homopolymer (N), of the above monomer (J), or a copolymer (N) of the monomer (J) and the other polymerizable unsaturated monomer (M), and a homopolymer (P), of the above monomer (K), or a copolymer (P) of the other polymerizable unsaturated monomer (M) and the monomer (K), or a mixture of the copolymer (N) and a silane-containing compound (I) (hereinafter referred to as "(4) resin composition").

(5) A reaction product (T) of a copolymer (R) and a compound (S), the copolymer (R) consisting essentially of a polymerizable unsaturated monomer (Q) containing functional group and the above epoxy-containing polymerizable unsaturated monomer (J), and the compound (S) having silane group and functional group complementarily reactive with the functional group of the monomer (Q) (hereinafter referred to as "(5) resin composition").

(6) A reaction product (X) of a copolymer (V) and a compound (W), the copolymer (V) consisting essentially of a polymerizable unsaturated monomer (U) containing functional group and the above silane-containing polymerizable unsaturated monomer (K), and the compound (W) having epoxy group and functional group complementarily reactive with the functional group of the monomer (U) (hereinafter referred to as "(6) resin composition").

(7) A mixture of the above homopolymer (N) or the copolymer (N) and the reaction product (H) (hereinafter referred to as "(7) resin composition"), and (8) A mixture of the above homopolymer (P) or the copolymer (P) and the reaction product (F) (hereinafter referred to as "(8) resin composition").

The term "functional group complementarily reactive" in the resin compositions (1) to (8) refers to the functional groups reactive with each other. Suitable functional groups are selectable for example from the list below.

TABLE 1

| Resin and Monomer | | Compound | |
|---|---|---|---|
| Kind | Functional Group | Kind | Functional Group |
| Resin (A) | Hydroxyl group (1) | Compound (B) | Hydroxyl group (1) |
| | Carboxyl group (2) | | Silane group (3) |
| | Silane group (3) | | Epoxy group (4) |
| | Isocyanato group (5) | | Isocyanato group (5) |
| | Hydroxyl group (1) | Compound (C) | Hydroxyl group (1) |
| | Carboxyl group (2) | | Carboxyl group (2) |
| | Silane group (3) | | Silane group (3) |
| | Epoxy group (4) | | Epoxy group (4) |
| | Isocyanato group (5) | | Isocyanato group (5) |
| | Mercapto group (6) | | Mercapto group (6) |
| | Amino group (NH, NH$_2$) (7) | | Amino group (NH, NH$_2$) (7) |
| | | | Unsaturated group (8) |
| Resin (E) | Same groups as Resin (A) | Compound (B) | Same as above |
| Resin (G) | Same groups as Resin (A) | Compound (C) | Same as above |
| Monomer (Q) | Hydroxyl group (1) | Compound (S) | Hydroxyl group (1) |
| | Epxoy group (4) | | Carboxyl group (2) |
| | Isocyanato group (5) | | Silane group (3) |
| | | | Isocyanato group (5) |
| | | | Mercapto group (6) |
| | | | Amino group (NH, NH$_2$) (7) |
| Monomer (U) | Hydroxyl group (1) | Compound (W) | Hydroxyl group (1) |
| | Carboxyl group (2) | | Silane group (3) |
| | Silane group (3) | | Epoxy group (4) |
| | Isocyanato group (5) | | Isocyanato group (5) |
| | Amino group (NH, NH$_2$) (7) | | Unsaturated group (8) |

The complementarily reactive functional groups can be suitably selected from the above list to provide a combination. Suitable combinations are given below. Combinations of functional groups of resin (A)/compound (B) [or resin (E)/compound (B)]:

(1)/(5), (2)/(4), (3)/(3), (5)/(1), etc. Combinations of functional groups of resin (A)/compound (C) [or resin (G)/compound (C)]:

(1)/(5), (2)/(3), (2)/(4), (2)/(5), (3)/(3), (4)/(2), (4)/(6), (4)/(7), (5)/(1), (5)/(2), (5)/(6), (5)/(7), (6)/(4), (6)/(8), (7)/(4), (7)/(8), (7)/(5), etc. Combinations of functional groups of monomer (Q)/compound (S):

(1)/(5), (4)/(2), (4)/(6), (4)/(7), (5)/(1), (5)/(2), (5)/(3), (5)/(6), (5)/(7), etc. Combinations of functional groups of monomer (U)/compound (W):

(1)/(5), (2)/(4), (2)/(5), (3)/(1), (5)/(1), (6)/(4), (6)/(5), (6)/(8), (7)/(4), (7)/(8), (7)/(5), etc.

(1) Resin composition

The resin (A) can be suitably selected without specific limitation from conventional resins having the foregoing functional groups. Specific examples of the resin (A) are vinyl resins, fluorine-containing resins, polyester resins, alkyd resins, silicone resins, urethane resins, polyether resins, etc.

The resin (A) has at least two functional groups reactive with the functional groups of the compounds (B) and (C) on the average in the molecule. The functional groups in the resin (A) may be the same or different.

When the resin (A) has the same functional groups, for example the resin (A) containing at least two hydroxyl groups on the average may be reacted with the compounds (B) and (C), both containing the isocyanato group (5), or the resin (A) containing at least two isocyanato groups (5) on the average may be reacted with the compound (B) containing the hydroxyl group (1) and the compound (C) containing the isocyanato group (5).

When the resin (A) has different functional groups, for example the resin (A) containing at least one hydroxyl group (1) and at least one carboxyl group (2) on the average may be reacted with the compound (C) containing the isocyanato group (5) and the compound (B) containing the epoxy group (4).

The functional group of the compound (B) to be reacted with the functional group of the resin (A) may be epoxy. Similarly the functional group of the compound (C) to be reacted with the functional group of the resin (A) may be silane.

Described below are the resins (A) containing hydroxyl, carboxyl, isocyanato, silane, epoxy or like functional groups. [Hydroxyl-containing resin]

Examples of such resin include those given below in items (1) to (6).

(1) Hydroxyl-containing vinyl-type resin

The resin is a polymer of a hydroxyl-containing polymerizable unsaturated monomer (a) to be described below and when required other polymerizable unsaturated monomers (b).

Hydroxyl-containing polymerizable unsaturated monomer (a)

Typical of such monomer are the compounds represented below by the formulas (1) to (4)

$$CH_2=CH \atop | \atop OR^1 \qquad (1)$$

wherein $R^1$ is a hydrogen atom or a hydroxyalkyl group;

$$CH_2=CH \atop | \atop CH_2-O-R^1 \qquad (2)$$

wherein $R^1$ is as defined above;

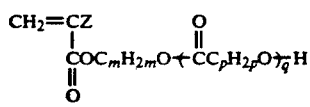  (3)

wherein Z is a hydrogen atom or a methyl group, m is an integer of 2 to 8, p is an integer of 2 to 18, and q is an integer of 0 to 7;

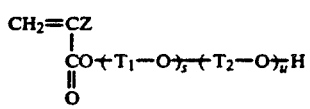  (4)

wherein Z is as defined above, $T_1$ and $T_2$ are the same or different and each represent a $C_{1-20}$ bivalent hydrocarbon group, and s and u are each an integer of 0 to 10 provided that the sum of s and u is 1 to 10.

The hydroxyalkyl group in the formulas (1) and (2) has 1 to 6 carbon atoms. Specific examples are —$C_2H_4OH$, —$C_3H_6OH$, —$C_4H_8OH$, etc.

Examples of the $C_{1-20}$ bivalent hydrocarbon group in the formula (4) are

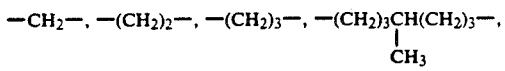

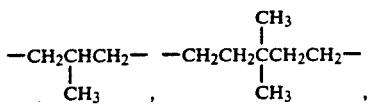

—$(CH_2)_{10}$—, —$(CH_2)_{12}$—, —$(CH_2)_{18}$—,

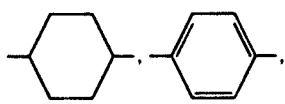

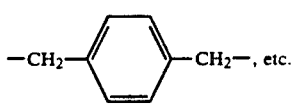

Examples of the monomer component of the formula (2) include those represented by the formulas
$CH_2=CHCH_2OH$,   $CH_2=CHCH_2OCH_2CH_2OH$,
$CH_2=CHCH_2O+CH_2CH_2O)_2H$,
$CH_2=CHCH_2O+CH_2CH_2O)_3H$, etc.

Examples of the monomer component of the formula (3) include those represented by the formulas $CH_2=C(R^6)COOC_2H_4OH$, $CH_2=C(R^6)COOC_3H_6OH$,

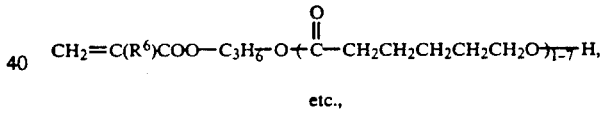

etc., wherein $R^6$ is a hydrogen atom or methyl group.

Examples of the monomer component of the formula (4) include those represented by the formulas

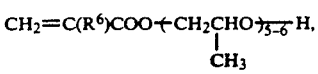

$CH_2=C(R^6)COO+CH_2CH_2O)_{4-5}H$, $CH_2=C(R^6)COO+CH_2CH_2O)_{7-8}H$, $CH_2=C(R^6)COO+CH_2CH_2CH_2CH_2O)_{4-5}H$,

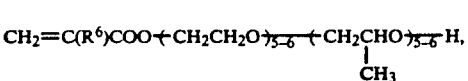

etc., where $R^6$ is as defined above.

Also usable as the monomer (a) is an adduct of any of hydroxyl-containing unsaturated monomers of the formulas (1) to (4) with ε-caprolactone, γ-valerolactone or like lactone.

Other polymerizable unsaturated monomer (b)

Typical of such monomer are those exemplified below in (b-1) to (b-6).

(b-1) Olefin-type compounds such as ethylene, propylene, butylene, isoprene, chloroprene, etc.

(b-2) Vinyl ethers and allyl ethers such as ethyl vinyl ether, propyl vinyl ether, isopropyl vinyl ether, butyl vinyl ether, tert-butyl vinyl ether, pentyl vinyl ether, hexyl vinyl ether, isohexyl vinyl ether, octyl vinyl ether, 4-methyl-1-pentyl vinyl ether and like chain-like alkyl vinyl ethers, cyclopentyl vinyl ether, cyclohexyl vinyl ether and like cycloalkyl vinyl ethers, phenyl vinyl ether, o-, m- or p-tolyl vinyl ether and like aryl vinyl ethers, benzyl vinyl ether, phenethyl vinyl ether and like aralkyl vinyl ethers, etc.

(b-3) Vinyl esters and propenyl esters such as vinyl acetate, vinyl lactate, vinyl butyrate, vinyl isobutyrate, vinyl caproate, vinyl isocaproate, vinyl pivalate, vinyl caprate and like vinyl esters, isopropenyl acetate, isopropenyl propionate and like propenyl esters, etc.

(b-4) Esters of acrylic or methacrylic acids such as $C_{1-18}$ alkyl esters of acrylic or methacrylic acids including methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_{2-18}$ alkoxyalkyl esters of acrylic or methacrylic acids including methoxybutyl acrylate, methoxybutyl methacrylate, methoxyethyl acrylate, methoxyethyl methacrylate, ethoxybutyl acrylate and ethoxybutyl methacrylate, etc.

(b-5) Vinyl aromatic compounds such as styrene, α-methyl styrene, vinyltoluene, p-chlorostyrene, etc.

(b-6) Acrylonitrile, methacrylonitrile, etc.

(2) Hydroxyl-containing fluorine resin

The resin is a polymer of a hydroxyl-containing polymerizable unsaturated monomer (a), a fluorine-containing polymerizable unsaturated monomer (c) and when required a polymerizable unsaturated monomer (b).

Fluorine-containing polymerizable unsaturated monomer (c)

Typical of the monomer (c) are the compounds of the formulas (5) and (6)

$$CX_2=CX_2 \tag{5}$$

wherein the groups X are the same or different and each represent a hydrogen atom, a chlorine atom, a bromine atom, a fluorine atom, an alkyl group or a haloalkyl group provided that the compound contains at least one fluorine atom;

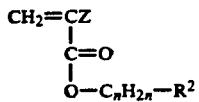   (6)

wherein Z is as defined above, $R^2$ is a fluoroalkyl group and n is an integer of 1 to 10.

The alkyl group in the formula (5) has 1 to 8 carbon atoms, preferably 1 to 6 carbon atoms. Specific examples are methyl, ethyl, propyl, isopropyl, butyl, pentyl, hexyl, heptyl, octyl, etc. The haloalkyl group has 1 to 6 carbon atoms, preferably 1 to 4 carbon atoms. Specific examples are $CF_3$, $CHF_2$, $CH_2F$, $CCl_3$, $CHCl_2$, $CH_2Cl$, $CFCl_2$, $(CF_2)_2CF_3$, $(CF_2)_3CF_3$, $CF_2CH_3$, $CF_2CHF_2$, $CF_2Br$, $CH_2Br$, etc.

Examples of the monomer of the formula (5) include the compounds represented by the formulas $CF_2=CF_2$, $CHF=CF_2$, $CH_2=CF_2$, $CH_2=CHF$, $CClF=CF_2$, $CHCl=CF_2$, $CCl_2=CF_2$, $CClF=CClF$, $CHF=CCl_2$, $CH_2=CClF$, $CCl_2=CClF$, $CF_3CF=CF_2$, $CF_3CF=CHF$, $CF_3CH=CF_2$, $CF_3CF=CH_2$, $CHF_2CF=CHF$, $CF_3CF=CF_2$, $CH_3CF=CF_2$, $CH_3CF=CH_2$, $CF_2ClCF=CF_2$, $CF_3CCl=CF_2$, $CF_3CF=CFCl$, $CF_2ClCCl=CF_2$, $CF_2ClCF=CPCl$, $CFCl_2CF=CF_2$, $CF_2CCl=CClF$, $CF_3CCl=CCl_2$, $CClF_2CF=CCl_2$, $CCl_3CF=CF_2$, $CF_2ClCCl=CCl_2$, $CFCl_2CCl=CCl_2$, $CF_3CF=CHCl$, $CClF_2CF=CHCl$, $CF_3CCl=CHCl$, $CHF_2CCl=CCl_2$, $CF_2ClCH=CCl_2$, $CF_2ClCCl=CHCl$, $CCl_3CF=CHCl$, $CF_2ClCF=CF_2$, $CF_2BrCH=CF_2$, $CF_3CBr=CHBr$, $CF_2ClCBr=CH_2$, $CH_2BrCF=CCl_2$, $CF_3CBr=CH_2$, $CF_2CH=CHBr$, $CF_2BrCH=CHF$, $CF_2BrCF=CF_2$, $CF_3CF_2CF=CF_2$, $CF_3CF=CFCF_3$, $CF_3CH=CFCF_3$, $CF_2=CFCF_2CHF_2$, $CF_3CF_2CF=CH_2$, $CF_3CH=CHCF_3$, $CF_2=CFCF_2CH_3$, $CF_2=CFCH_2CH_3$, $CF_3CH_2CH=CH_2$, $CF_3CH=CHCH_3$, $CF_2=CHCH_2CH_3$, $CH_3CF_2CH=CH_2$, $CFH_2CH=CHCFH_2$, $CH_3CF_2CH=CH_3$, $CH_2=CFCH_2CF_3$, $CF_3(CF_2)_2CF=CF_2$, $CF_3(CF_2)_3CF=CF_2$, $CF_3CF=CHF$, $CF_3CF=CH_2$, etc.

The fluoroalkyl group in the formula (6) has 3 to 21 carbon atoms. Specific examples are $C_4F_9$, $(CF_2)_6CF(CF_3)_2$, $C_8F_{17}$, $C_{10}F_{21}$, $C_8F_{17}$, $(CF_2)_7CF_3$, etc.

Examples of the monomer of the formula (6) include the compounds represented by the formulas

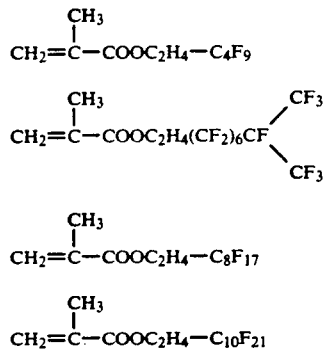

(3) Hydroxyl-containing polyester resin

The resin is prepared by esterification or ester interchange reaction of a polybasic acid with a polyhydric alcohol. Examples of useful polybasic acids include the compounds having 2 to 4 carboxyl groups or methyl carboxylate groups per molecule such as phthalic acid or anhydride, isophthalic acid, terephthalic acid, maleic acid or anhydride, pyromellitic acid or anhydride, succinic acid or anhydride, sebacic acid, azelaic acid, dodecanedicarboxylic acid, dimethyl isophthalate, dimethyl terephthalate and the like. Examples of useful polyhydric alcohols are alcohols having 2 to 6 hydroxyl groups per molecule such as ethylene glycol, polyethylene glycol, propylene glycol, neopentyl glycol, 1,6-hexanediol, trimethylolpropane, pentaerythritol, glycerin, tricyclodecanedimethanol, etc. When required, monobasic acids are usable for preparation of the resin and include fatty acids of castor oil, soybean oil, tall oil, linseed oil or the like, and benzoic acid.

(4) Hydroxyl-containing polyurethane resin

The resin is an isocyanate-free one prepared by modifying a hydroxyl-containing vinyl-type resin, a hydroxyl- and fluorine-containing resin, a hydroxyl-containing polyester resin or the like with a polyisocyanate compound such as tolylene diisocyanate, xylylene diisocyanate, hexamethylene diisocyanate, isophorone diisocyanate or the like.

(5) Hydroxyl-containing silicone resin

The resin is an alkoxysilane-free and silanol-free one prepared by modifying a hydroxyl-containing vinyl-type resin, hydroxyl- and fluorine-containing resin, hydroxyl-containing polyester resin or the like with a silicone resin such as Z-6018 or Z-6188 (trademarks for products of Dow Corning Ltd.), or SH 5050, SH 6018 or SH 6188 (trademarks for products of Toray Silicone Co., Ltd.).

(6) Vinyl alcohol-styrene copolymer

Carboxyl-containing resin

Typical examples of such resin are given below in 1) to 3):

1) Carboxyl-containing vinyl resin

The resin is a polymer of a carboxyl-containing polymerizable unsaturated monomer (d) and when required the polymerizable unsaturated monomers (b).

Carboxyl-containing polymerizable unsaturated monomer (d)

Typical of the monomer (d) are the compounds represented by the formulas (7) and (8)

$$\begin{array}{c} R^3 \\ \phantom{R}\diagdown \\ R^4 \end{array} C=C \begin{array}{c} R^5 \\ \diagup \\ \diagdown \\ COOH \end{array} \qquad (7)$$

wherein $R_3$ is a hydrogen atom or a lower alkyl group, $R_4$ is a hydrogen atom, a lower alkyl group or a carboxyl group, and $R_5$ is a hydrogen atom, a lower alkyl group or a carboxyl-lower alkyl group;

$$CH_2=C-\overset{R^6}{\underset{|}{C}}-\overset{O}{\underset{||}{C}}-O-C_mH_{2m}-COOH \qquad (8)$$

wherein $R^6$ is a hydrogen atom or a methyl group, and m is as defined above.

Preferred lower alkyl groups in the formula (7) are those having 1 to 4 carbon atoms, especially methyl.

Examples of the monomer of the formula (7) are acrylic acid, methacrylic acid, crotonic acid, itaconic acid, maleic acid, maleic anhydride, fumaric acid, etc.

Examples of the monomer of the formula (8) are 2-carboxyethyl acrylate or methacrylate, 2-carboxypropyl acrylate or methacrylate, etc.

Also usable in the monomer (d) is an adduct of 1 mole of the hydroxyl-containing polymerizable unsaturated monomer (a) with 1 mole of a polycarboxylic anhydride compound such as maleic anhydride, itaconic anhydride, succinic anhydride, phthalic anhydride or the like.

2) Carboxyl- and fluorine-containing resin

The resin is a copolymer of the fluorine-containing polymerizable unsaturated monomer (c), the carboxyl-containing polymerizable unsaturated monomer (d), and when required the polymerizable unsaturated monomer (b). These monomers can be any of the above-mentioned monomers.

Also usable is a resin prepared by reacting the fluorine-containing polyol resin with the polycarboxylic anhydride compound.

3) Carboxyl-containing polyester resin

Examples of such resin include a resin prepared by esterification of a polybasic acid with a polyhydric alcohol.

Isocyanato-containing resin

Examples of such resin include those given below in (1) to (4).

1) Isocyanato-containing vinyl resin

The resin is a polymer of the isocyanato-containing polymerizable unsaturated monomer (e) and when required the polymerizable unsaturated monomers (b).

Isocyanato-containing polymerizable unsaturated monomer (e)

Typical examples of the monomer (e) are those represented by the formulas (9) and (10)

$$CH_2=\overset{R^6}{\underset{|}{C}}-COO\text{-}(C_nH_{2n})\text{-}NCO \qquad (9)$$

wherein $R^6$ and n are as defined above, examples of the monomer of the formula (9) being isocyanate ethyl acrylate or methacrylate; and $$CH_2=\overset{}{\underset{\underset{R^6}{|}}{C}}-\underset{R^7}{\underset{}{\bigcirc}}\text{-}C_nH_{2n}\text{-}NCO \qquad (10)$$

wherein $R^6$ and n are as defined above and $R^7$ is a hydrogen atom or an alkyl group having 1 to 5 carbon atoms, an example of the monomer of the formula (10) being α,α-dimethyl-m-isopropenyl benzyl isocyanate.

Also usable as the monomer (e) is a reaction product of 1 mole of the hydroxyl-containing polymerizable unsaturated monomer (b) and 1 mole of a polyisocyanate compound. Examples of useful polyisocyanate compounds are tolylene diisocyanate, 1,6-hexamethylene diisocyanate, 4,4'-diphenylmethane diisocyanate, 4,4'-diphenyl ether diisocyanate, phenylene diisocyanate, naphthalin diisocyanate, biphenylene diisocyanate, 3,3'-dimethyl-4,4'-biphenylene diisocyanate, dicyclohexylmethane-4,4'-diisocyanate, p-xylylene diisocyanate, m-xylylene diisocyanate, bis(4-isocyanatephenyl)sulfone, isopropylidenebis(4-phenylisocyanate), lysine isocyanate and isophorone diisocyanate, polymers thereof, biurets thereof, etc.

Also usable as the isocyanato- and fluorine-containing resin is a reaction product prepared by reacting a hydroxyl- and fluorine-containing resin with, e.g., the polyisocyanate compound.

(2) Isocyanato- and fluorine-containing resin

The resin is one prepared by reacting the hydroxyl- and fluorine-containing resin with the polyisocyanate compound such that an excessive amount of the isocyanate component remains therein.

(3) Isocyanato-containing polyester resin

The resin is one prepared by reacting the hydroxyl-containing polyester resin with the polyisocyanate compound such that an excessive amount of the isocyanate component remains therein.

(4) Isocyanato-containing polyurethane resin

The resin is one prepared by reacting the hydroxyl-containing polyether resin with the polyisocyanate compound such that an excessive amount of the isocyanate component remains therein.

Silane-containing resin

A resin prepared by reacting the hydoxyl-containing resin with an isocyanato-containing silane compound to be described later and a resin prepared by reacting the isocyanato-containing resin with a hydroxyl-containing silane compound to be described later, and the silicone resin used in preparation of the hydroxyl-containing silicone resin.

Epoxy-containing resin

A resin prepared by reacting the hydroxyl-containing resin with an isocyanato-containing epoxy compound to be described later.

The compound (B) used for (1) resin composition is the compound having per molecule at least one functional group reactive with the functional group of the resin (A) and at least one epoxy group, per molecule. The functional group reactive with the functional group of the resin (A) may be epoxy group. When the functional group is epoxy group, it is desirable that the compound (B) have at least 2 epoxy groups per molecule.

Described below are typical examples of the compound (B).

Hydroxyl-containing epoxy compound

Examples of such compound include the compounds represented by the formulas (11) to (21)

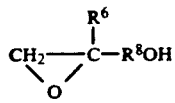 (11)

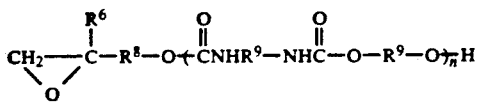 (12)

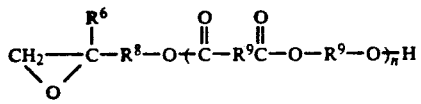 (13)

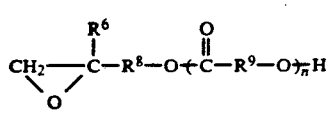 (14)

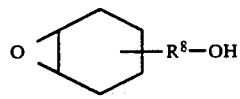 (15)

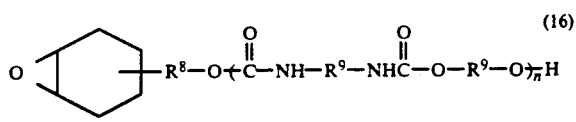 (16)

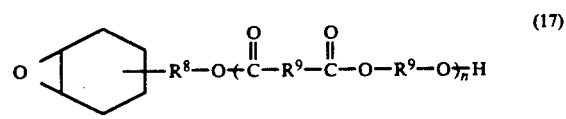 (17)

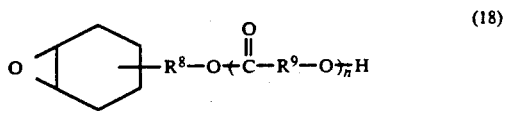 (18)

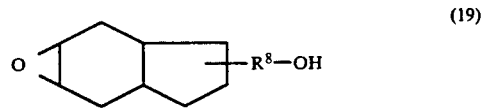 (19)

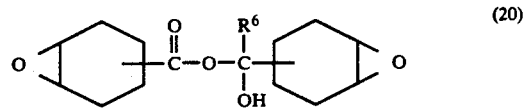 (20)

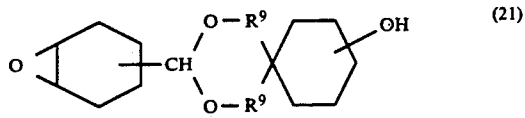 (21)

In the foregoing formulas, $R^6$ and n are as defined above, $R^8$ is a $C_{1-8}$ bivalent hydrocarbon group and the groups $R^9$ are the same or different and each represent a $C_{1-20}$ bivalent hydrocarbon group.

In the formulas (11) to (21), the $C_{1-8}$ bivalent hydrocarbon group can be suitably selected from the foregoing $C_{1-20}$ bivalent hydrocarbon groups, and the $C_{1-20}$ bivalent hydrocarbon groups include the above examples of such group.

Specific examples of the compounds of the formulas (11) to (21) are those represented by the formulas

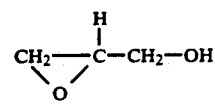

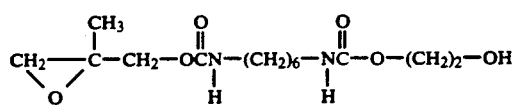

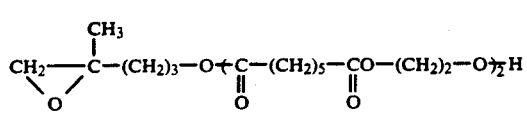

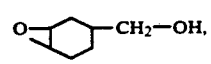

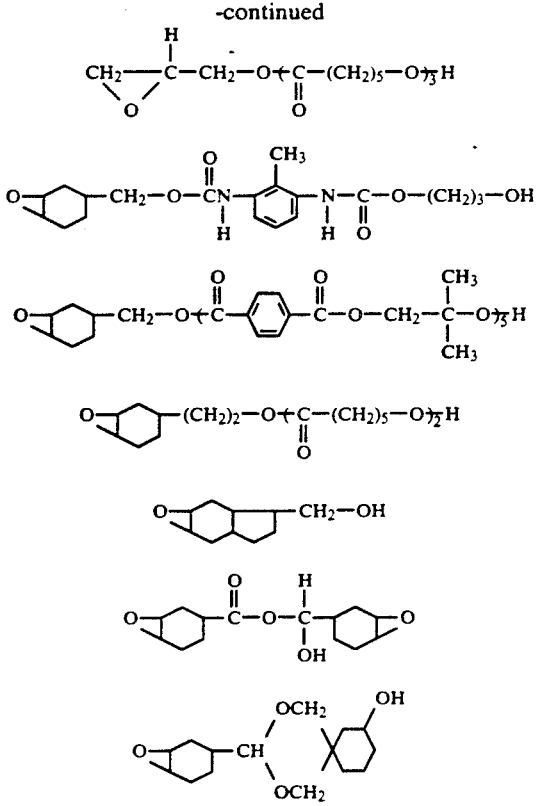

Silane-containing epoxy compound

Examples of such compound include the compounds represented by the formulas (22) to (25)

In the foregoing formulas, $R^6$ and $R^8$ have the same meaning as above, the groups $R^8$ are the same or different, and the groups Y are the same or different and each represent a hydrogen atom, a hydroxyl group, a hydrolyzable group, a $C_{1-8}$ alkyl group, an aryl group or an aralkyl group provided that at least one of the groups Y is a hydrogen atom, a hydroxyl group or a hydrolyzable group.

Examples of hydrolyzable groups in the formulas (22) to (25) include those of the formulas (1') to (6'). Examples of the $C_{1-8}$ alkyl group, aryl group and aralkyl group in the formulas (22) to (25) include the above examples of these groups.

Specific examples of the compounds of the formulas (22) to (25) are those represented by the formulas Also usable is a condensation product of each compound of the formulas (22) to (25) with a polysilane compound to be described later (such as compounds of the formulas (38) to (40)). Specific examples of such compound are those represented by the formula Polyepoxy compound Examples of such compound include the compounds represented by the formulas (26) to (33)

-continued

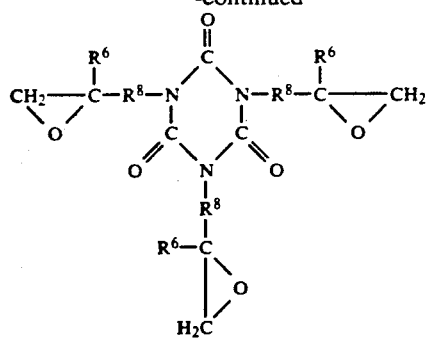  (27)

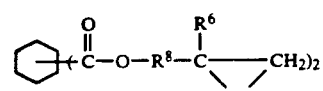  (28)

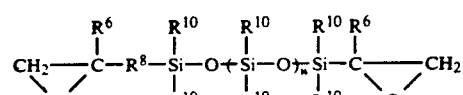  (29)

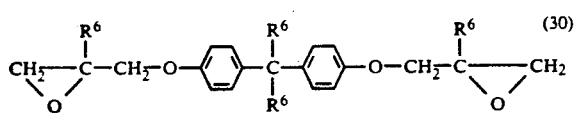  (30)

-continued

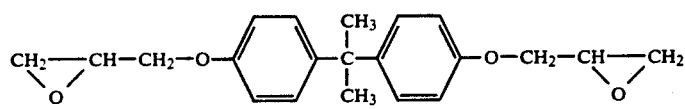  (31)

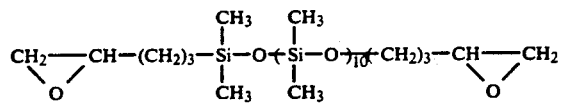  (32)

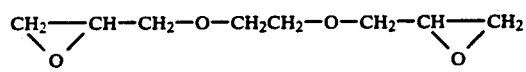  (33)

In the foregoing formulas, $R^6$ and $R^8$ are as defined above, the groups $R^6$ and $R^8$ are the same or different, the $R^{10}$ groups are the same or different and are each a $C_{1-8}$ alkyl group, a phenyl group, an aryl group or an aralkyl group, or are the same or different and are each a hydrogen atom or a $C_{1-4}$ alkyl group, and W is an integer of 0 to 10.

Examples of the compounds of the formulas (26) to (33) are those represented by the formulas

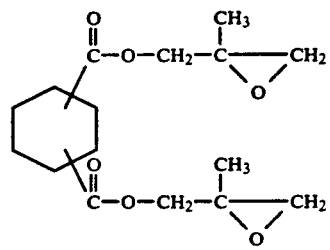

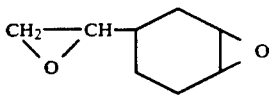

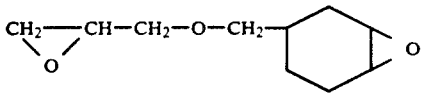

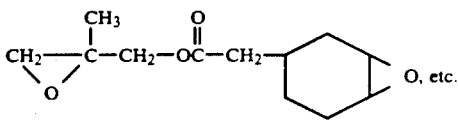

Also usable as the polyepoxy compound is an adduct of each of the compounds represented by the formulas

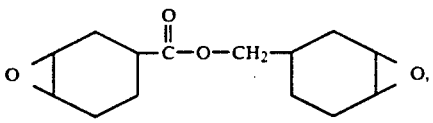

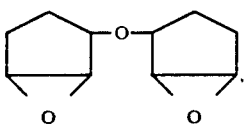

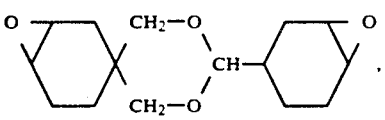

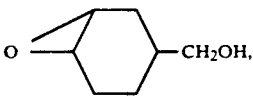

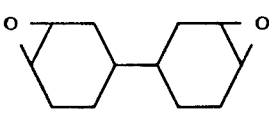

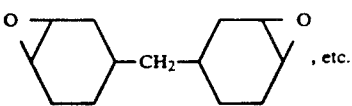, etc.

with a polyisocyanate compound to be exemplified below. Examples of useful polyisocyanate compounds are organic diisocyanates such as hexamethylene diisocyanate, trimethyl hexamethylene diisocyanate and like aliphatic diisocyanates; hydrogenated xylylene diisocyanate, isophorone diisocyanate and like cyclic aliphatic diisocyanates; tolylene diisocyanate, 4,4'-diphenylmethane diisocyanate and like aromatic diisocyanates; an adduct of the organic diisocyanate with a polyhydric alcohol, a low-molecular-weight polyester resin, water or the like; a polymer of such organic diisocyanates with each other, isocyanate biurets, etc. Representative commercial products of such polyisocyanate compounds are those available under the trademarks: "BURNOCK D-750, -800, DN-950, -970 and -15-455" (products of Dainippon Ink And Chemicals Incorporated), "DESMODUL L, NHL, IL and N3390" (products of Bayer AG, West Germany), "TAKENATE D-102, -202, -110N and -123N" (products of Takeda Chemical Industries, Ltd.), "COLONATE-L, -HL, -EH and -203" (products of Nippon Polyurethane Kogyo K.K.), "DURANATE 24A-90CX" (product of Asahi Chemical Industry Co., Ltd.), etc. Also usable as the polyepoxy compound are an adduct of a compound of the formula

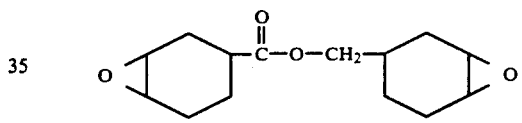

with a polybasic acid; a product prepared by oxidizing an ester having unsaturated group such as a group

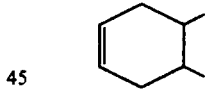

in the molecule with a peracetic acid or the like, examples of the ester being an ester of 900 in number-average molecular weight prepared by esterifying tetrahydrophthalic anhydride trimethylolpropane, 1,4-butanediol or the like.

Isocyanato-containing epoxy compound

Examples of such compound include those prepared by reacting the hydroxyl-containing epoxy compound with the polyisocyanate compound such that the epoxy and isocyanato groups remain in the reaction product. Examples of such reaction product are a reaction product of the compound of the formula (11) with a hexamethylene diisocyanate

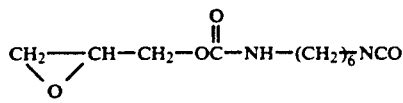

a reaction product of the compound of the formula (15) with a tolylene diisocyanate

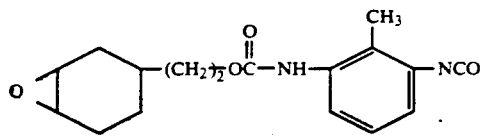

a reaction product of the compound of the formula (18) with an isophorone diisocyanate

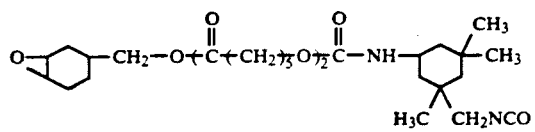

a reaction product of the compound of the formula (20) with an isophorone diisocyanate

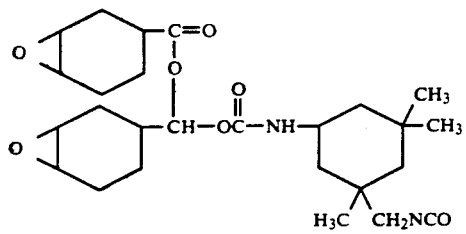

a reaction product of the compound of the formula (21) with a xylylene diisocyanate

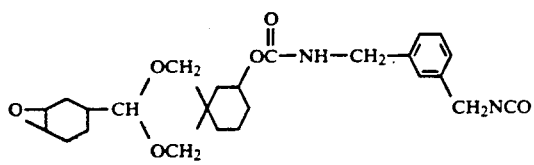

The compound (C) useful for the (1) resin component has at least one silane group and at least one functional group reactive with the functional group of the resin (A), per molecule. The functional group reactive with the functional group of the resin (A) may be silane. In this case, the compound contains at least two silane groups in the molecule.

Described below are typical examples of the compound (C).

Hydroxyl-containing silane compound

Examples of such compound are those represented by the formulas (34) to (36)

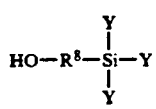 (34)

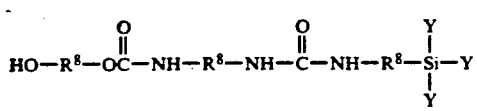 (35)

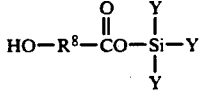 (36)

In the formulas, $R^8$, $R^{10}$ and Y are as defined above; the groups $R^8$, $R^{10}$ and Y are the same or different provided that at least one of the groups Y is a hydrogen atom, a hydroxyl group or a hydrolyzable group.

Specific examples of the compounds of the formulas (34) to (36) are those represented by the formulas

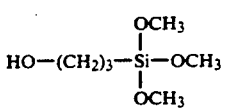

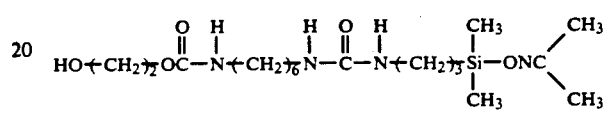

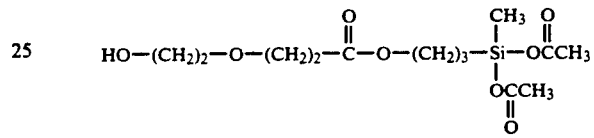

Also usable as such compound is a condensation product of each compound of the formulas (34) to (36) with a polysilane compound to be described later. An example of such condensation product is the compound represented by the formula

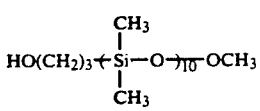

Polysilane compound

The polysilane compound contains, in the molecule, at least two groups selected from hydrolyzable groups directly attached to silicon atoms and SiOH.

Examples of such compound are those represented by the formulas (38) to (40)

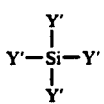 (38)

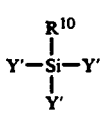 (39)

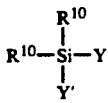 (40)

In the foregoing formulas, the groups Y' are the same or different and each represent a hydrogen atom, a hydroxyl group or a hydrolyzable group, $R^{10}$ is as defined above and the groups $R^{10}$ are the same or different.

Specific examples of compounds of the formulas (38) to (40) are dimethyldimethoxysilane, dibutyldimethoxysilane, di-iso-propyldipropoxysilane, diphenyldibutoxysilane, diphenyldiethoxysilane, diethyldisilanol, dihexyldisilanol methyltrimethoxysilane, methyltriethoxysilane, ethyltriethoxysilane, propyltrimethoxysilane, phenyltriethoxysilane, phenyltributyroxysilane, hexyltriacetoxysilane, methyltrisilanol, phenyltrisilanol, tetramethoxysilane, tetraethoxysilane, tetrapropioxysilane, tetraacetoxysilane, di-iso-propioxydivaleroxysilane, tetrasilanol, and the compounds represented by the formulas

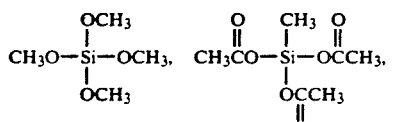

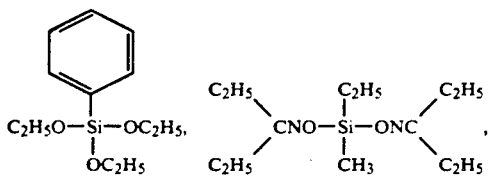

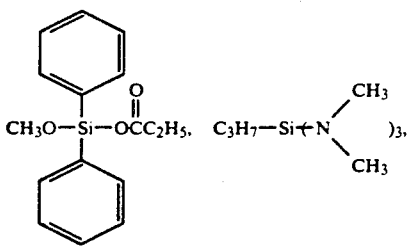

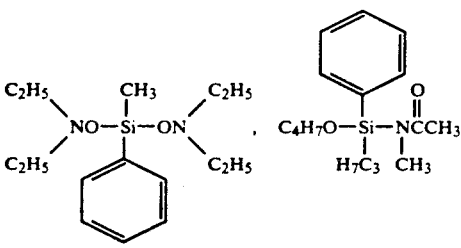

A condensation product of such polysilane compounds with each other is also usable.

Epoxy-containing silane compound

Examples of such compound include the foregoing silane-containing epoxy compounds.

Isocyanato-containing silane compound

Examples of such compound include the compound represented by the formulae (41) and (41)'

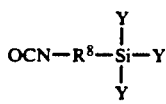
(41)

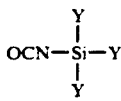
(41)'

In the foregoing formula, $R^8$ and Y are as defined above and the groups Y are the same or different.

At least one of the groups Y is a hydrogen atom, a hydroxyl group or a hydrolyzable group.

Examples of the compound of the formulae (41) and (41)' are those represented by the formulas

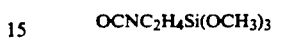
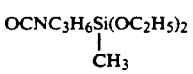
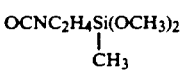
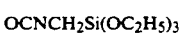
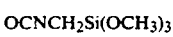
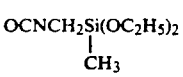
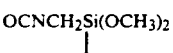
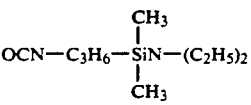
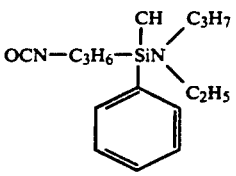
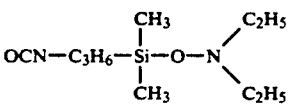
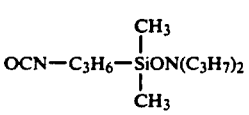
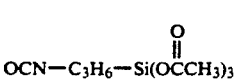

-continued

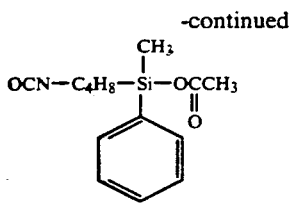

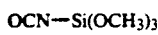

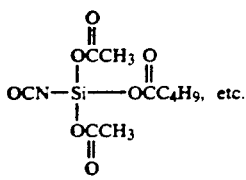

Also usable as the isocyanato-containing silane compound is a compound prepared by reacting the hydroxyl-containing silane compound with the polyisocyanate compound.

Examples of such isocyanato-containing silane compound include a reaction product of the compound of the formula (34) and a hexamethylene diisocyanate or tolylene diisocyanate, such as the compounds represented by the formulas

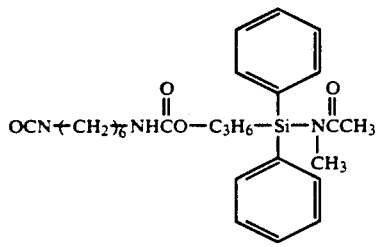

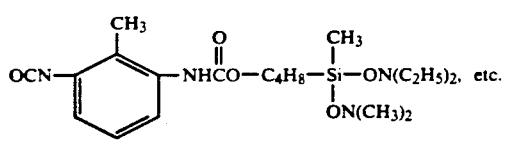

Useful isocyanato-containing silane compounds further include a condensation product of the epoxy-containing silane compound with, e.g. the polysilane compound, such as the compound represented by the formula

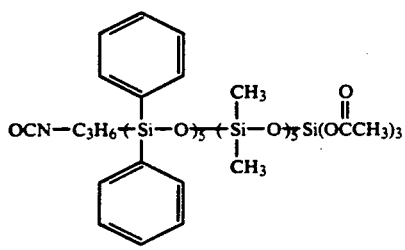

Mercapto-containing silane compound

Examples of such compound include the compound represented by the formula (42)

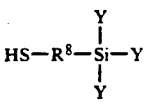

(42)

wherein $R^8$ and Y are as defined above, and the groups Y are the same or different provided that at least one of the groups Y is a hydrogen atom, a hydroxyl group or a hydrolyzable group.

Specific examples of the compound of the formula (42) are those represented by the formula

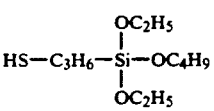

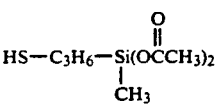

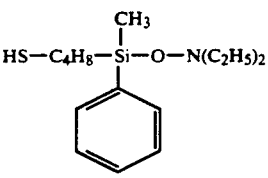

Also usable as the mercapto-containing silane compound is a reaction product prepared by reacting the hydroxyl-containing silane compound with the polyisocyanate compound and a thiochol compound (e.g. HS—$C_mH_{2m}$—OH wherein m has the same meaning as above), such as the compound represented by the formula

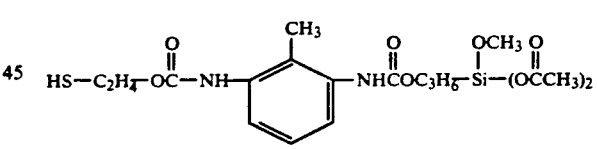

Also usable is a condensation product of the mercapto silane compound with, e.g., a polysilane compound.

NH or $NH_2$ group-containing silane compound

Examples of such compound include the compounds represented by the formulas (43) and (44)

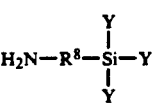

(43)

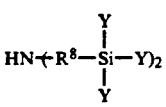

(44)

In the foregoing formulas, $R^8$, $R^{10}$ and Y are as defined above, the groups $R^8$, $R^{10}$ and Y are the same or different provided that at least one of the groups Y is a hydrogen atom, a hydroxyl group or a hydrolyzable group.

Specific examples of the compounds of the formulas (43) and (44) are those represented by the formulas

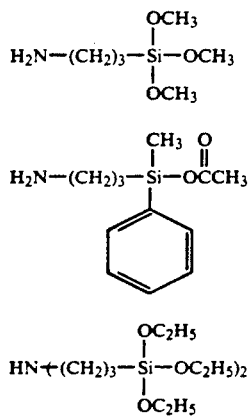

Also usable is a condensation product of the compound of the formula (43) or (44) with the polysilane compound, such as the compound represented by the formula

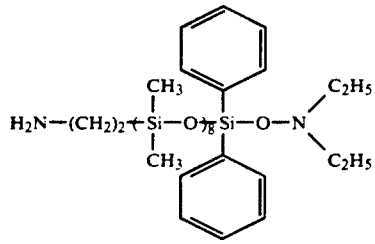

Unsaturated group-containing silane compound

Usable as such compound is a silane-containing polymerizable unsaturated monomer (10) to be described later.

The resin (A) has a number-average molecular weight of about 3,000 to about 200,000, preferably about 5,000 to about 80,000.

The compounds (B) and (C) have a number-average molecular weight of about 120 to 10,000, preferably 120 to 3,000.

The reaction product (D) prepared by reacting the resin (A), the compound (B) and the compound (C) has an average of at least 1, preferably about 2 to about 40, epoxy groups and an average of at least 1, preferably about 2 to about 40, silane groups, per molecule. This reaction product corresponds to the resin (Y).

(2) Resin composition

The resin (E) has per molecule an average of at least one functional group reactive with the functional group of the compound (B) and is suitably selected from the above examples of (1) resin composition.

The compound (B) has an average of at least one functional group reactive with the functional group of the resin (E) and an average of at least one epoxy group, per molecule. The functional group of the compound (B) may be epoxy group. Usable as the compound (B) are the compounds for (1) resin composition.

The resin (G) has per molecule an average of at least one functional group reactive with the functional group of the compound (C) and is suitably selected from the above examples of (1) resin composition.

The resin (C) has an average of at least one functional group reactive with the functional group of the resin (G) and an average of at least one silane group, per molecule. The functional group of the compound (C) may be silane group. Examples of the compound (C) include the compounds as exemplified above for (1) resin composition.

The resins (E) and (G) each have a number-average molecular weight of about 3,000 to about 200,000, preferably about 5,000 to about 80,000.

The reaction product (F) prepared by reacting the resin (E) with the compound (B) has an average of at least 1, preferably about 2 to about 40, epoxy groups, per molecule. This reaction product (F) corresponds to the resin (Z-2).

The reaction product (H) prepared by reacting the resin (G) with the compound (C) has an average of at least 1, preferably about 2 to about 40, silane groups, per molecule. This reaction product (H) corresponds to the resin (Z-1).

The reaction product (F) is usually mixed with the reaction product (H) in such proportions as to achieve an epoxy/silane molar ratio of between 1/99 and 99/1. Such product corresponds to the resin mixture of (Z).

(3) Resin composition

The epoxy-containing polymerizable unsaturated monomer (J) for use in preparation of (3) resin composition is a compound containing epoxy group and radically polymerizable unsaturated group in the molecule. The epoxy group may be alicyclic or aliphatic. Examples of the radically polymerizable unsaturated group include the groups represented by the formulas

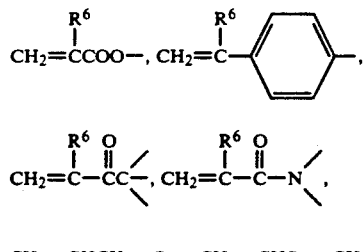

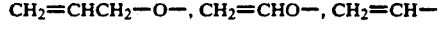

In the foregoing formula, $R^6$ is as defined above.

Examples of the epoxy-containing polymerizable unsaturated monomer having radically polymerizable unsaturated group $CH_2$=$C(R^6)COO$— include the compounds represented by the formulas (45) to (57)

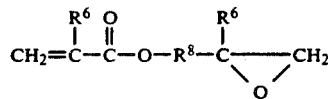

(45)

-continued
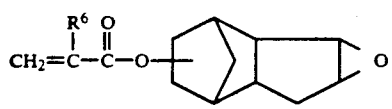 (46)
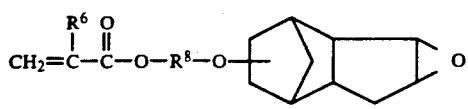 (47)
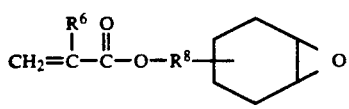 (48)
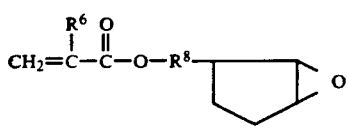 (49)
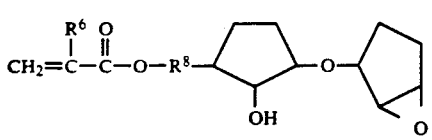 (50)
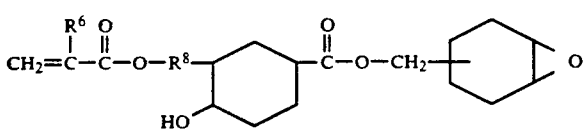 (51)
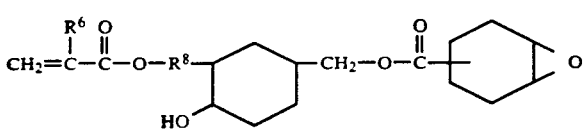 (52)
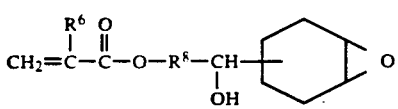 (53)
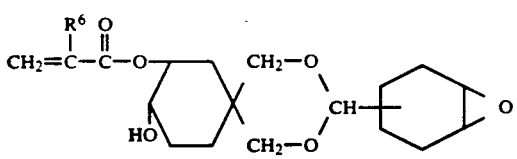 (54)
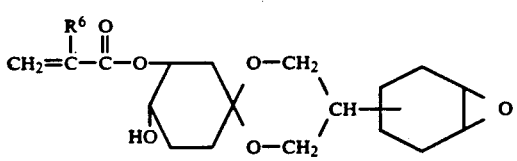 (55)
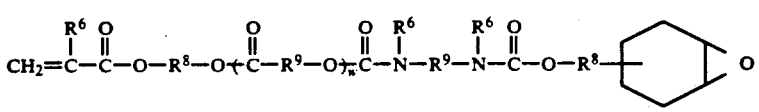 (56)
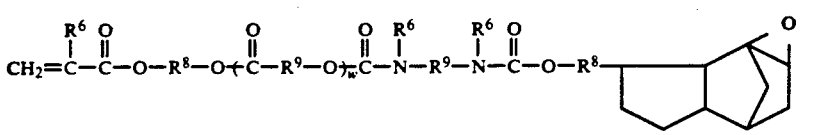 (57)

In the foregoing formula, $R^6$, $R^8$, $R^9$ and W are as defined above, and the groups $R^6$, $R^8$ and $R^9$ are the same or different.

Specific examples of the monomers of the formulas (45) to (57) are those represented by the formulas

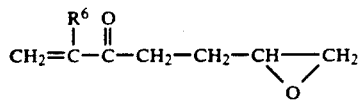

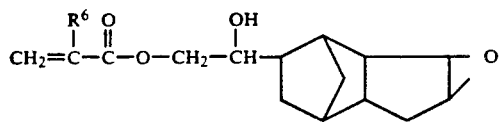

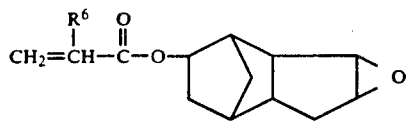

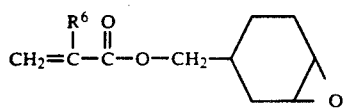

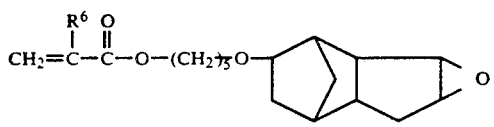

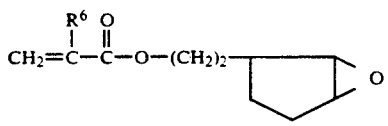

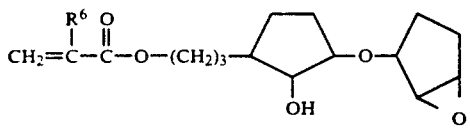

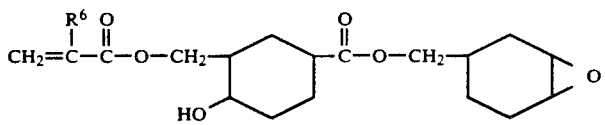

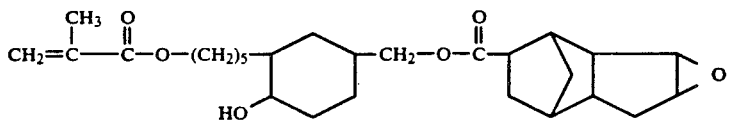

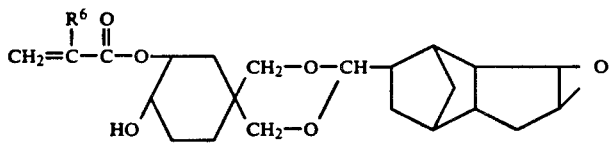

Examples of the epoxy-containing polymerizable unsaturated monomer having radically polymerizable unsaturated group $CH_2=C-(R^6)-CO-N-$ are those represented by the formulas (58) to (60)

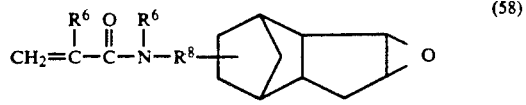 (58)

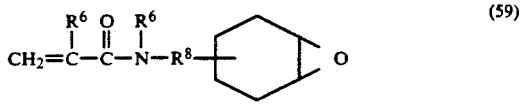 (59)

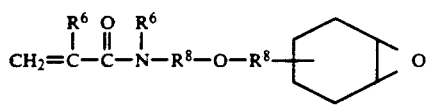 (60)

In the foregoing formulas, $R^6$ and $R^8$ are as defined above, and the groups $R^6$ and $R^8$ are the same or different.

Specific examples of the compounds of the formulas (58) to (60) include those represented by the formulas

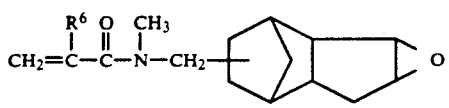

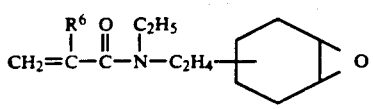

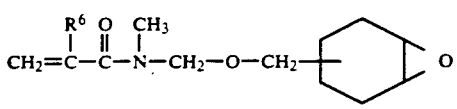

Examples of the epoxy-containing polymerizable unsaturated monomer having radically polymerizable unsaturated group

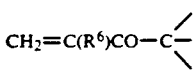

include those represented by the formulas (61) to (63)

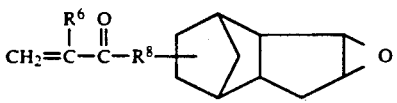 (61)

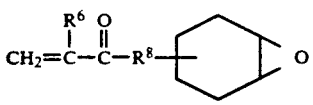 (62)

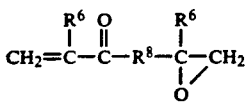 (63)

In the foregoing formulas, $R^6$ and $R^8$ are as defined above, and the groups $R^6$ and $R^8$ are the same or different.

Specific examples of the compounds of the formulas (61) to (63) are those represented by the formulas

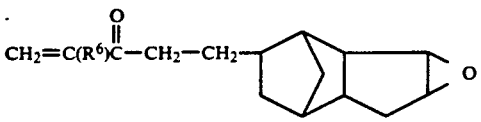

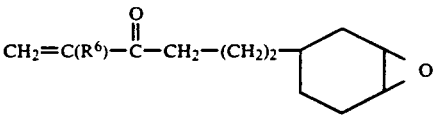

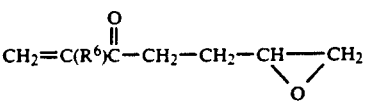

Examples of the epoxy-containing polymerizable unsaturated monomers having radically polymerizable unsaturated group $CH_2=C(R^6)CO-N\diagdown$ are those represented by the formulas (64) to (69)

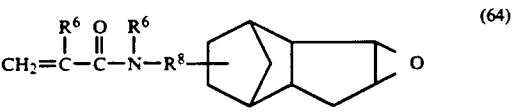 (64)

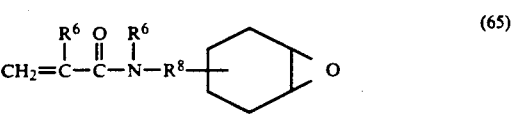 (65)

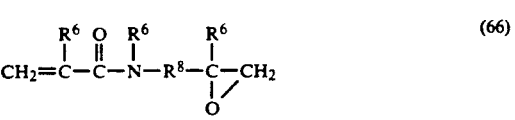 (66)

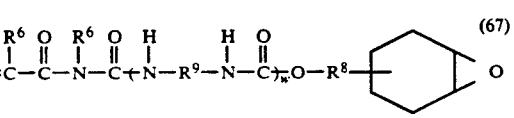 (67)

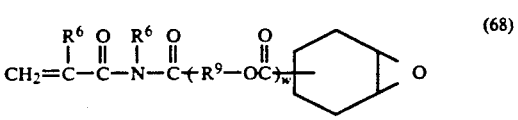 (68)

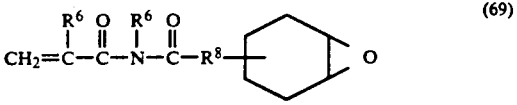 (69)

In the foregoing formulas, $R^6$, $R^8$, $R^9$ and w are as defined above, and the groups $R^6$, $R^8$ and $R^9$ are the same or different.

Specific examples of the compounds of the formulas (64) to (69) are those represented by the formulas

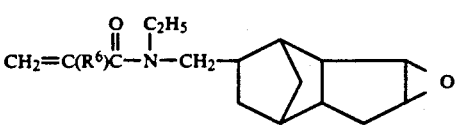

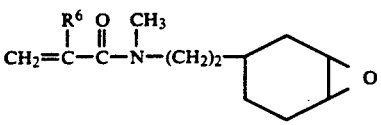

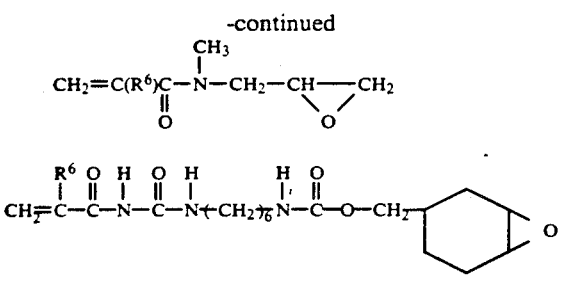

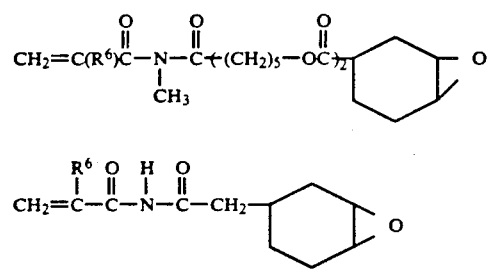

Examples of the epoxy-containing polymerizable unsaturated monomer having radically polymerizable unsaturated group $CH_2=CHCH_2O-$ are those represented by the formulas (70) to (73)

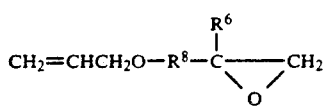
(70)

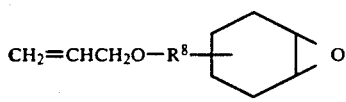
(71)

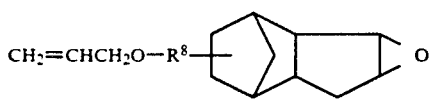
(72)

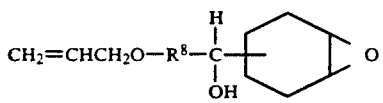
(73)

In the foregoing formulas, $R^6$ and $R^8$ are as defined above, and the groups $R^8$ are the same or different.

Specific examples of the compounds of the formulas (70) to (73) include those represented by the formulas

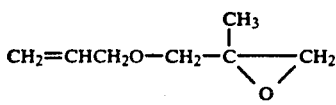

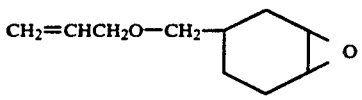

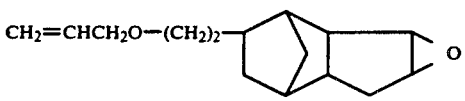

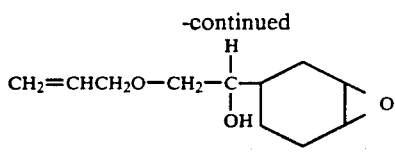

Examples of the epoxy-containing polymerizable unsaturated monomer having radically polymerizable unsaturated group $CH_2=CHO-$ are inclusive of those represented by the formulas (74) to (76)

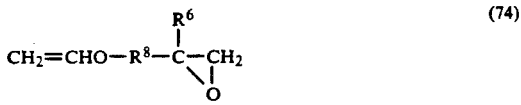
(74)

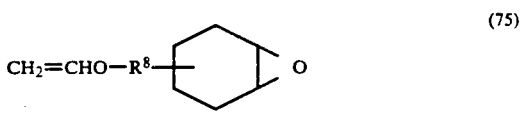
(75)

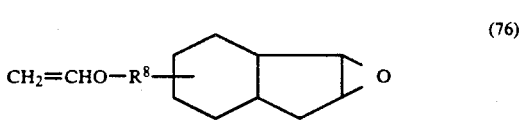
(76)

In the foregoing formulas, $R^6$ and $R^8$ are as defined above, and the groups $R^8$ are the same or different.

Specific examples of the compounds of the formulas (74) to (76) are those represented by the formulas

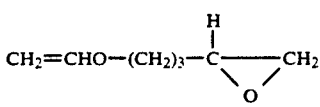

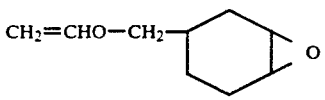

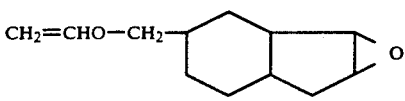

Examples of the epoxy-containing polymerizable unsaturated monomer having radically polymerizable unsaturated group $CH_2=CH-$ include the compounds represented by the formulas (77) to (79)

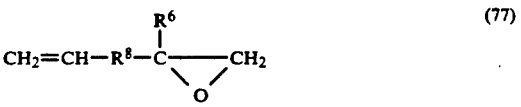
(77)

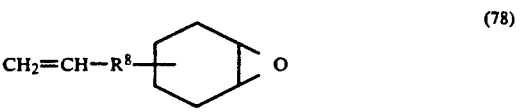
(78)

(79)

In the foregoing formulas, $R^6$ and $R^8$ are as defined above, and the groups $R^8$ are the same or different.

Specific examples of the compounds of the formulas (77) to (79) include those represented by the formulas

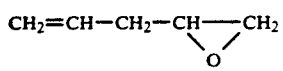

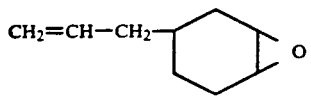

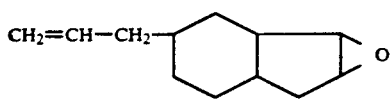

Examples of the epoxy-containing polymerizable unsaturated monomer having radically polymerizable unsaturated group

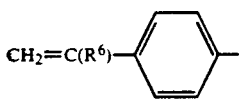

include the compounds represented by the formulas (80) to (84)

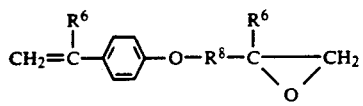 (80)

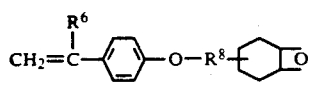 (81)

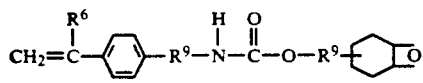 (82)

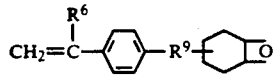 (83)

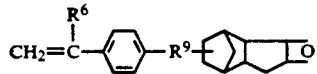 (84)

In the foregoing formulas, $R^6$, $R^8$ and $R^9$ are as defined above, and the groups $R^6$ and $R^8$ are the same or different.

Specific examples of the compounds of the formulas (80) to (84) include those represented by the formulas

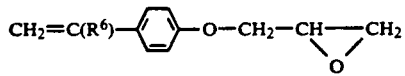

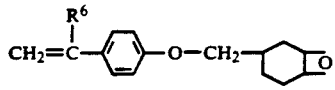

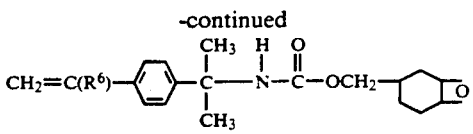

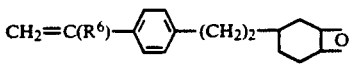

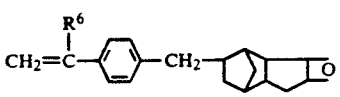

Silane-containing polymerizable unsaturated monomer (K)

The silane-containing polymerizable unsaturated monomer (K) is a compound having at least one silane group and at least one radically polymerizable unsaturated group per molecule. Examples of the radically polymerizable unsaturated group are those represented by the formulas

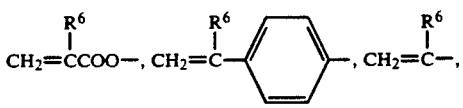

Examples of the silane-containing polymerizable unsaturated monomer having radically polymerizable unsaturated group $CH_2=C(R^6)-COO-$ include the compounds represented by the formula (85)

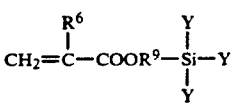 (85)

wherein $R^6$, $R^9$ and Y are as defined above, and the groups Y are the same or different provided that at least one of groups Y is a hydrogen atom, a hydroxyl group or a hydrolyzable group.

Examples of the compound of the formula (85) are γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ-(meth)acryloxypropyldimethylethoxysilane, γ-(meth)acryloxypropylphenylmethylmethoxysilane, γ-(meth)acryloxypropylphenylmethylethoxysilane, γ-(meth)acryloxypropyltrisilanol, γ-(meth)acryloxypropylmethyldihydroxysilane, γ-(meth)acryloxybutylphenyldihydroxysilane, γ-(meth)acryloxypropyldimethylhydroxysilane, γ-(meth)acryloxypropylphenylmethylhydroxysilane, and the compounds represented by the formulas

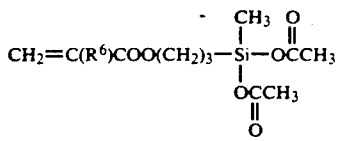

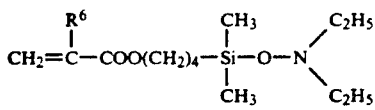

Examples of the silane-containing polymerizable unsaturated monomer having radically polymerizable unsaturated group

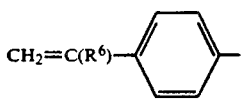

include the compounds represented by the formulas (86) to (88)

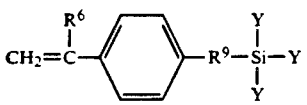 (86)

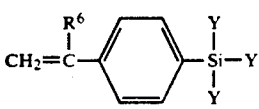 (87)

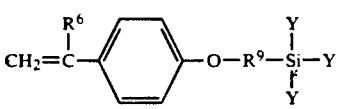 (88)

In the foregoing formulas, $R^6$, $R^9$ and Y are as defined above, and the groups Y are the same or different provided that at least one of the groups Y is a hydrogen atom, a hydroxyl group or a hydrolyzable group.

Specific examples of the compounds of the formulas (86) to (88) include the compounds represented by the formulas

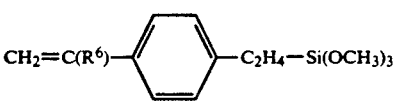

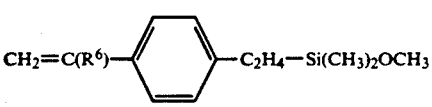

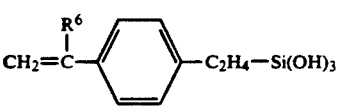

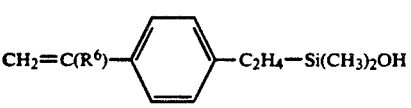

-continued

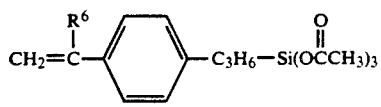

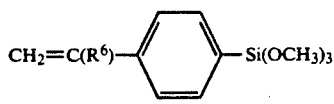

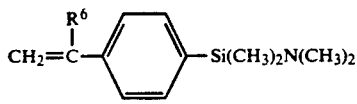

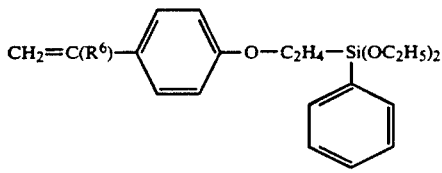

Examples of the silane-containing polymerizable unsaturated monomer containing radically polymerizable unsaturated group of the formula $CH_2=C(R^6)$— include the compounds of the formulas (89) and (90)

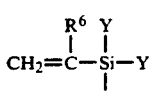 (89)

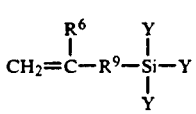 (90)

In the formulas (89) and (90), $R^6$, $R^9$ and Y are as defined above, and the groups Y may be the same or different provided that at least one of the groups Y is a hydrogen atom, a hydroxyl group or a hydrolyzable group.

Specific examples of the compounds of the formulas (89) and (90) are those represented by the formulas

-continued

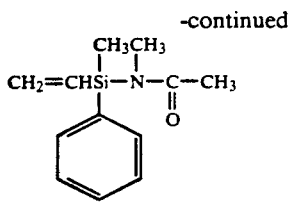

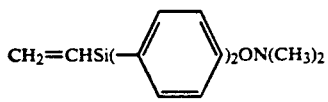

Examples of the silane-containing polymerizable unsaturated monomer having radically polymerizable unsaturated group of the formula CH$_2$=CHO— include the compounds represented by the formulas (91) and (92).

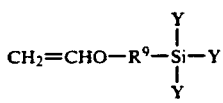
(91)

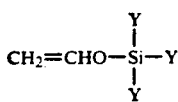
(92)

In the foregoing formulas, R$^9$ and Y are as defined above, and the groups Y may be the same or different provided that at least one of the groups Y is a hydrogen atom, a hydroxyl group or a hydrolyzable group.

Specific examples of the compounds represented by the formulas (91) and (92) include those represented by the formulas

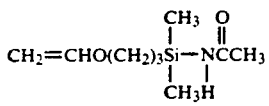

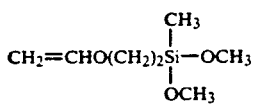

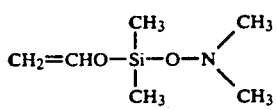

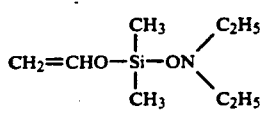

Examples of the silane-containing polymerizable unsaturated monomer having radically polymerizable unsaturated group of the formula CH$_2$=CHCH$_2$O— include the compounds of the formulas (93) and (94)

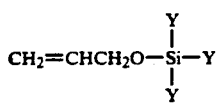
(93)

-continued

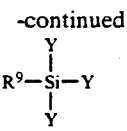
(94)

In the foregoing formulas (93) and (94), R$^9$ and Y are as defined above, and the groups Y may be the same or different provided that at least one of the groups Y is a hydrogen atom, a hydroxyl group or a hydrolyzable group.

Specific examples of the compounds of the formulas (93) and (94) include those represented by the formulas

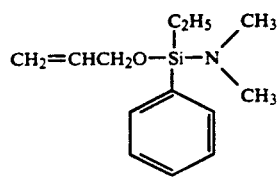

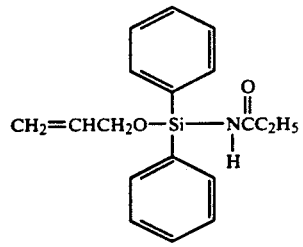

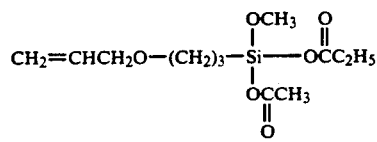

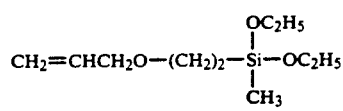

Also usable is a polysiloxane unsaturated monomer containing silane group and polymerizable unsaturated group and prepared by reacting the silane-containing polymerizable unsaturated monomer with, for example, a polysilane compound such as the compounds of the formulas (38) to (40).

Representative of the polysiloxane unsaturated monomer is a polysiloxane macromonomer prepared by reacting 30 to 0.001 mole % of the compound of the formula (85) with 70 to 99.999 mole % of at least one of the compounds of the formulas (38) to (40) (for example those disclosed in Japanese Unexamined Patent Publication No. 62-275132). Also useful as the polysiloxane unsaturated monomer are the compounds represented by the formulas

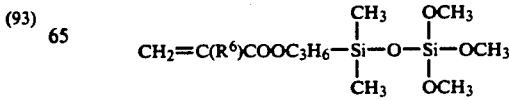

-continued

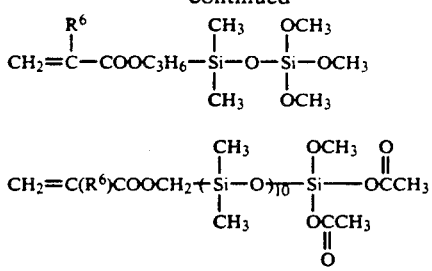

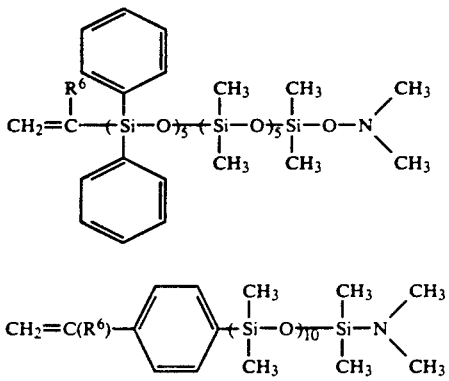

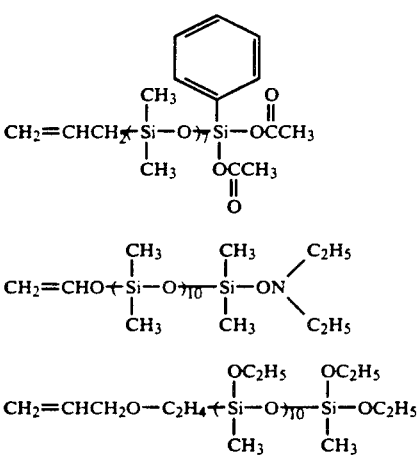

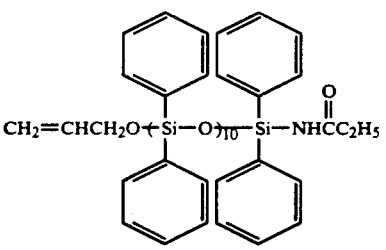

Other polymerizable unsaturated monomers (M)

Usable as the monomer (M) is a compound having radically polymerizable unsaturated group but free of groups reactive with the epoxy group of the monomer (J) and the silane group of the monomer (K). Specific examples of the monomer (M) are the hydroxyl-containing unsaturated monomer (a), polymerizable unsaturated monomers (b-1) to (b-6), fluorine-containing unsaturated monomer (c), carboxyl-containing polymerizable unsaturated monomer (d), etc.

The monomers (J) and (K), and when required the other monomer (M) are subjected to radical polymerizable reaction to form a copolymer (L). The copolymer (L) has an average of at least one, preferably about 2 to about 40, epoxy groups and an average of at least one, preferably about 2 to about 40, silane groups, per molecule. The copolymer (L) corresponds to the resin (Y).

(4) Resin composition

Usable are the monomers (J), (K) and (M) are those as described above for (3) resin composition.

The copolymer (N) of the monomers (J) and (M) has an average of at least one, preferably about 2 to about 40, epoxy groups per molecule. The copolymer corresponds to the resin (Z-2).

The copolymer (P) of the monomers (K) and (M) or the silane-containing compound (I) has an average of at least one, preferably about 2 to about 40, silane groups per molecule. They correspond to the resin or compound (Z-1).

The homopolymer or copolymer (N) and the homopolymer or copolymer (P) or silane-containing compound (I) are used in such proportions as to achieve an epoxy/silane molar ratio of between 1/99 to 99/1. They correspond to the resin mixture (Z).

(5) Resin composition

Polymerizable unsaturated monomer (Q)

The monomer is a compound having in the molecule radically polymerizable unsaturated group and functional group reactive with the functional group of the compound (S).

The functional group of the monomer (Q) is inactive with an epoxy group and may be an epoxy group.

Examples of the copolymer (R) prepared by using the monomer (Q) are given below in items (i) to (iii).

(i) A copolymer having hydroxyl group as functional group and prepared by radical polymerization of the hydroxyl-containing polymerizable unsaturated monomer (a), epoxy-containing polymerizable unsaturated monomer (J) and when required polymerizable unsaturated monomer (such as monomers (b-1) to (b-6) and fluorine-containing polymerizable unsaturated monomer (c), etc.).

(ii) A copolymer having isocyanato group as functional group and prepared by radical polymerization of isocyanate-containing polymerizable unsaturated monomer (e), epoxy-containing polymerizable unsaturated monomer (J), and when required polymerizable unsaturated monomer (such as monomers (b-1) to (b-6) and fluorine-containing polymerizable unsaturated monomer (c), etc.).

(iii) A copolymer having epoxy group as functional group and prepared by radical polymerization of epoxy-containing polymerizable unsaturated monomer (J), and when required polymerizable unsaturated monomer (such as monomers (b-1) to (b-6) and fluorine-containing polymerizable unsaturated monomer (c), etc.).

The compound (S) has silane group and functional group reactive with the functional group of the copolymer (R), and is suitably selected from classes of the compound (c).

The reaction product (T) prepared by the reaction of the copolymer (R) and the compound (S) has an average of at least one, preferably 2 to about 40, epoxy groups and an average of at least one, preferably about 2 to about 40, silane groups, per molecule. The reaction product (T) corresponds to the resin (Y).

(6) Resin composition

Polymerizable unsaturated monomer (U)

The monomer is a compound having radically polymerizable unsaturated group and functional group reactive with the functional group of the compound (W) in the molecule.

The functional group of the monomer (U) is inactive with a silane group and may be a silane group.

Examples of the copolymer (V) prepared by using the monomer (U) are given below in items (i) to (iii).

(i) A copolymer having hydroxyl group as functional group and prepared by radical polymerization of the hydroxyl-containing polymerizable unsaturated monomer (a), silane-containing polymerizable unsaturated monomer (K), and when required polymerizable unsaturated monomer (such as monomers (b-1) to (b-6) and fluorine-containing polymerizable unsaturated monomer (c), etc.).

(ii) A copolymer having isocyanato group as functional group and prepared by radical polymerization of the isocyanato-containing polymerizable unsaturated monomer (e), silane-containing polymerizable unsaturated monomer (K), and when required polymerizable unsaturated monomer (such as monomers (b-1) to (b-6) and fluorine-containing polymerizable unsaturated monomer (c), etc.).

(iii) A copolymer having carboxyl group as functional group and prepared by radical polymerization of the carboxyl-containing polymerizable unsaturated monomer (d), silane-containing polymerizable unsaturated monomer (K), and when required polymerizable unsaturated monomer (such as monomers (b-1) to (b-6) and fluorine-containing polymerizable unsaturated monomer (c), etc.).

The compound (W) is a compound having epoxy group and functional group reactive with the functional group of the copolymer (V), and is suitably selected from classes of the the compound (B).

The reaction product (X) prepared by the reaction of the copolymer (V) and the compound (W) has an average of at least one, preferably about 2 to about 40, epoxy groups and an average of at least one, preferably about 2 to about 40, silane groups, per molecule. The reaction product (X) corresponds to the resin (Y).

(7) Resin composition

Usable as the homopolymer (N), copolymer (N) and the reaction product (H) are the same as described above for (2) and (4) resin compositions.

The proportions of the homopolymer or copolymer (N) and the reaction product (H) are such that (7) resin composition has an epoxy/silane molar ratio of between 1/99 to 99/1.

(8) Resin composition

Usable as the homopolymer (P) or the copolymer (P) and the reaction product (F) are the same as described above for (2) and (4) resin compositions.

The proportions of the homopolymer or copolymer (P) and the reaction product (F) are such that (8) resin composition has an epoxy/silane molar ratio of between 1/99 to 99/1.

The resin components described hereinbefore can be prepared by conventional methods. More specifically the reaction between hydroxyl and isocyanato groups, condensation reaction of silane group, copolymerization reaction and the like can be conducted in a conventional manner. For example, the reaction between isocyanato and hydroxyl groups is effected at a temperature between room temperature and about 130° C. for about 30 to about 360 minutes. The condensation reaction of silane group is conducted in the presence of an acid catalyst (for example, hydrochloric acid, sulfuric acid, formic acid, acetic acid or the like) with heating at a temperature of about 40° to about 150° C. for about 1 to about 24 hours. The copolymerization reaction is carried out in the same manner under the same conditions as the reaction for synthesis of conventional acrylic or vinyl resins or the like. Such synthetic reaction can be performed, for example, by dissolving or dispersing the monomer component in an organic solvent and heating the solution or dispersion in the presence of a radical polymerization initiator at a temperature of about 60° to about 180° C. with stirring. The reaction time usually ranges from about 1 to about 10 hours. Useful organic solvents include those inactive with the monomer or the compound to be used for polymerization, such as ether solvents, ester solvents or hydrocarbon solvents. The hydrocarbon solvent is preferably used in combination with another solvent in view of a high solubility. The radical polymerization initiator can be any of polymerization initiators commonly employed and including peroxides such as benzoyl peroxide, t-butyl peroxy-2-ethylhexanaoate and the like, and azo compounds such as azoisobutyronitrile, azobisdimethylvaleronitrile and the like.

The reaction products (D), (F), (H), (L), (N), (P), (T) and (X) of (1) to (6) resin compositions have a number-average molecular weight of about 3,000 to about 200,000, preferably about 5,000 to about 80,000.

It is preferred that the resin composition have carboxyl and/or hydroxyl groups to increase the curability of the composition in addition to epoxy and silane groups.

The resin compositions containing carboxyl group can be made water-soluble or -dispersible by neutralization with a basic compound.

Also useful are modified resins prepared by chemically combining the above resins or the above copolymers with another resin (such as vinyl resin, polyester resin, urethane resin, silicone resin, epoxy resin or the like).

The above resin compositions may be used as dissolved or dispersed in a solvent or in the form of a nonaqueous dispersion in which the resin composition is present as a dispersion stabilizer. Examples of useful solvents are toluene, xylene and like hydrocarbon solvents; methyl ethyl ketone, methyl isobutyl ketone and like ketone solvents; ethyl acetate, butyl acetate and like ester solvents; dioxane, ethylene glycol diethyl ether and like ether solvents; and butanol, propanol and like alcohol solvents.

The nonaqueous dispersion is described below.

The nonaqueous dispersion can be prepared by polymerizing at least one radically polymerizable unsaturated monomer in the presence of a polymerization initiator and a dispersion stabilizer in an organic solvent in which the monomer and the dispersion stabilizer are soluble but the polymer particles formed by the polymerization of the monomer are insoluble.

The monomers as described hereinbefore are all usable for preparing the polymer present as the particulate component in the nonaqueous dispersion. Since the polymer present as the particle component in the nonaqueous dispersion is not to be dissolved in the organic solvent used, it is desirable to use a copolymer containing a predominant amount of a monomer having a high polarity. Preferred monomers for use herein include methyl acrylate or methacrylate, ethyl acrylate or methacrylate, acrylonitrile, methacrylonitrile, 2-hydroxyethyl acrylate, 2-hydroxyethyl methacrylate, hydroxypropyl acrylate, hydroxypropyl methacrylate, acrylamide, methacrylamide, acrylic acid, methacrylic acid, itaconic acid, styrene, vinyl toluene, $\alpha$-methylstyrene, N-methylol acrylamide or methacrylamide and the like. The particles contained in the nonaqueous dispersion can be crosslinked ones when desired. The particles can be internally crosslinked by various methods, as by copolymerizing polyfunctional monomers such as divinylbenzene, ethylene glycol dimethacrylate or by using concurrently the epoxy-containing monomer and carboxyl-containing monomer or the like.

Organic solvents useful in preparation of the nonaqueous dispersion include those substantially incapable of dissolving the dispersed polymer particles prepared by the polymerization but capable of solving well the dispersion stabilizer and the radically polymerizable unsaturated monomers. Examples of useful organic solvents are pentane, hexane, heptane, octane, mineral spirit, naphtha and like aliphatic hydrocarbons; benzene, toluene, xylene and like aromatic hydrocarbons; alcohol solvents, ether solvents, ester solvents and ketone solvents such as isopropyl alcohol, n-butyl alcohol, isobutyl alcohol, octyl alcohol, cellosolve, butyl cellosolve, diethylene glycol monobutyl ether, methyl isobutyl ketone, diisobutyl ketone, ethyl acyl ketone, methyl hexyl ketone, ethyl butyl ketone, ethyl acetate, isobutyl acetate, acyl acetate, 2-ethylhexyl acetate, etc. These organic solvents can be used singly or at least two of them are usable in mixture. Preferred solvents are combinations of a major amount of aliphatic hydrocarbon and a minor amount of aromatic hydrocarbon or the above-mentioned alcohol, ether, ester or ketone solvents. Trichlorotrifluoroethane, metaxylenehexafluoride, tetrachlorohexafluorobutane and like halogenated hydrocarbon are also usable when so required.

The polymerization of the above monomers is conducted in the presence of a radical polymerization initiator. Useful radical polymerization initiators are, for example, 2,2'-azobisisobutyronitrile, 2,2'-azobis(2,4-dimethylvaleronitrile) and like azo-type initiators, benzoyl peroxide, lauryl peroxide, tert-butyl peroctoate and like peroxide-type initiators. These polymerization initiators are usually used in an amount of about 0.2 to about 10 parts by weight per 100 parts by weight of the monomers to be polymerized. The amount of the dispersion stabilizer used for the polymerization is suitably determinable over a wide range depending on the kind of the dispersion stabilizer. Generally it is suitable to use the radically polymerizable unsaturated monomer or monomers in an amount of about 3 to about 240 parts by weight, preferably about 5 to about 82 parts by weight, per 100 parts by weight of the dispersion stabilizer.

The dispersion stabilizer and the polymer particles are combined together, whereby the storage stability of the nonaqueous dispersion is improved and the coating film formed is outstanding in transparency, surface smoothness and mechanical properties. The dispersion stabilizer and the polymer particles can be combined together as by polymerizing the radically polymerizable unsaturated monomer(s) in the presence of the dispersion stabilizer having polymerizable double bond.

The polymerizable double bond can be most conveniently introduced into the dispersion stabilizer by adducting an acrylic acid, methacrylic acid, itaconic acid or like $\alpha,\beta$-ethylenically unsaturated monocarboxylic acid to some of oxysilane groups present in the dispersion stabilizer. Also the introduction can be effected by adducting isocyanoethyl methacrylate or like isocyanato-containing monomer to the hydroxyl group contained in the dispersion stabilizer or by adducting glycidyl methacrylate or like monomers to some of carboxyl group present in the dispersion stabilizer.

The dispersion stabilizer can be also combined with the polymer particles using a reactive monomer as a monomer component for formation of polymer particles, such as $\gamma$-methacryloxypropyl trimethoxysilane, $\gamma$-methacryloxypropyl triethoxysilane, $\gamma$-acryloxypropyl trimethoxysilane, $\gamma$-methacryloxybutyl triethoxysilane, $\gamma$-acryloxypropyl trisilanol or the like.

2-2. Described below is the curing catalyst which is used conjointly with the resin composition (Y) and the resin mixture (Z) as described above.

Usable as said curing catalyst is at least one compound selected from the group consisting of organometallic compounds, Lewis acids, protonic acids and compounds with Si—O—Al bond(s).

(1) Useful as said organometallic compounds include metal alkoxide compounds, metal chelate compounds, metal alkyl compounds, etc.

Metal alkoxide compound

Useful metal alkoxide compounds include the compounds having alkoxy group, preferably $C_{1-18}$ alkoxy group, attached to a metal such as aluminum, titanium, zirconium, calcium, barium or the like. These compounds may contain an association of molecules. Preferred metal alkoxide compounds include, for example, aluminum alkoxide, titanium alkoxide and zirconium alkoxide. Specific examples of such compounds are given below.

Useful aluminum alkoxide compounds include those represented by the formula

(95)

wherein the groups $R^{12}$ are the same or different and each represent an alkyl group having 1 to 20 carbon atoms or an alkenyl group.

Examples of the alkyl group having 1 to 20 carbon atoms include nonyl, decyl, undecyl, dodecyl, tridecyl, tetradecyl, octadecyl and the like as well as the examples of alkyl groups of 1 to 8 carbon atoms given hereinbefore. Examples of the alkenyl group are vinyl, allyl and the like.

Examples of the aluminum alcoholate of the formula (95) are aluminum trimethoxide, aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide and the like. Among them, preferable are aluminum triisopropoxide, aluminum tri-sec-butoxide, aluminum tri-n-butoxide, etc.

Useful titanium alkoxide compounds include the titanates represented by the formula

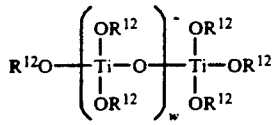

(96)

wherein w and $R^{12}$ are as defined above.

Examples of the titanate of the formula (96) wherein w is 0 are tetramethyl titanate, tetraethyl titanate, tetra-n-propyl titanate, tetraisopropyl titanate, tetra-n-butyl titanate, tetraisobutyl titanate, tetra-tert-butyl titanate, tetra-n-pentyl titanate, tetra-n-hexyl titanate, tetraisooctyl titanate, tetra-n-lauryl titanate, etc. Suitable results can be achieved by use of tetraisopropyl titanate, tetra-n-butyl titanate, tetraisobutyl titanate, tetra-tert-butyl titanate or the like. Of the titanates wherein w is 1 or more, those which can achieve good results are dimers to hendecamers (w=1 to 10 in the formula (96)) of tetraisopropyl titanate, tetra-n-butyl titanate, tetraisobutyl titanate, tetra-tert-butyl titanate or the like.

Useful zirconium alkoxide compounds include those represented by the formula

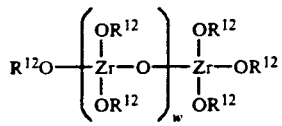

(97)

wherein w and $R^{12}$ are as defined above.

Examples of the zirconate of the formula (97) wherein w is 0 are tetraethyl zirconate, tetra-n-propyl zirconate, tetraisopropyl zirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate and the like. Suitable results can be obtained by use of tetraisopropyl zirconate, tetra-n-propyl zirconate, tetraisobutyl zirconate, tetra-n-butyl zirconate, tetra-sec-butyl zirconate, tetra-tert-butyl zirconate or the like. Of the zirconates wherein w is 1 or more, those which can produce suitable results are dimers to hendecamers (w=1 to 10 in the formula (97)) of tetraisopropyl zirconate, tetra-n-propyl zirconate, tetra-n-butyl zirconate, tetraisobutyl zirconate, tetra-sec-butyl zirconate, tetra-tert-butyl zirconate or the like. The zirconium alkoxide compound may contain an association of such zirconates as a constituent unit.

Metal chelate compound

Preferred metal chelate compounds include, for example, aluminum chelate compounds, titanium chelate compounds and zirconium chelate compounds. Among these chelate compounds, preferred are those containing as a ligand for forming a stable chelate ring a compound capable of forming a keto-enol tautomer.

Examples of the compound capable of forming a keto-enol tautomer are β-diketones (such as acetyl acetone), esters of acetoacetic acids (such as methyl acetoacetate), esters of malonic acids (such as ethyl malonate), ketones having hydroxyl group in the β-position (such as diacetone alcohol), aldehydes having hydroxyl group in the β-position (such as salicylaldehyde), esters having hydroxyl group in the β-position (such as methyl salicylate), etc. The use of esters of acetoacetic acids or β-diketones can achieve suitable results.

The aluminum chelate compound can be suitably prepared for example by admixing about 3 moles or less of the compound capable of forming a keto-enol tautomer with about 1 mole of the aluminum alkoxide, followed when required by heating. Examples of preferred aluminum chelate compounds for use in the invention are tris(ethylacetoacetate)aluminum, tris(n-propylacetoacetate)aluminum, tris(isopropylacetoacetate)aluminum, tris(n-butylacetoacetate)aluminum, isopropoxy-bis(ethylacetoacetate)aluminum, diisopropoxyethylacetoacetate aluminum, tris(acetylacetonato)aluminum, tris(propionylacetonato)aluminum, diisopropoxy-pionylacetonato aluminum, acetylacetonato-bis(propionylacetonato)aluminum, monoethylacetoacetate-bis(acetylacetonato)aluminum, tris)acetylacetonato)aluminum and the like.

The titanium chelate compound can be suitably prepared for example by admixing about 4 moles or less of the compound capable of forming a keto-enol tautomer with about 1 mole of the titanium alkoxide, followed when required by heating. Examples of preferred titanium chelate compounds are diisopropoxy-bis(ethylacetoacetate)titanate, diisopropoxy-bis-(acetylacetonato)titanate, etc.

The zirconium chelate compound can be suitably prepared for example by admixing about 4 moles or less of the compound capable of forming a keto-enol tautomer with about 1 mole of the zirconium alkoxide, followed when required by heating. Examples of preferred zirconium chelate compounds for use in the invention are tetrakis(acetylacetonato)zirconium, tetrakis (n-propylacetoacetate)zirconium, tetrakis(ethylacetoacetate)-zirconium and the like.

The aluminum chelate compounds, zirconium chelate compounds and titanium chelate compounds can be used singly or at least two of them are usable in mixture.

Metal alkyl compound

The compound has alkyl group, preferably $C_{1-20}$ alkyl group, bonded to a metal such as aluminum, zinc or the like. Examples of such compound are triethyl aluminum, diethyl zinc, etc.

(2) Useful Lewis acids include metal halides, compounds having metal, halogen and other substituents, and complexes of these compounds. Specific examples of such compounds are $AlCl_3$, $AlBF_3$, $AlF_3$, $AlEtCl_2$, $AlEt_2Cl$, $TiCl_4$, $TiBr_4$, $TiF_4$, $ZrCl_4$, $ZrBr_4$, $ZrF_4$, $SnCl_4$, $FeCl_3$, $SbCl_3$, $SbCl_5$, $PCl_3$, $PCl_5$, $GaCl_3$, $GaF_3$, $InF_3$, $BCl_3$, $BBr_3$, $BF_3$, $BF_3:(OC_2H_5)_2$, $BF_4:(OC_2H_5)_3$, $BCl_3:(OC_2H_5)_2$, $BF_3:NH_2C_2H_5$, $BF_3:NH_2C_2H_4OH$, $BF_3:NH_2CH_2CH_2CH_3$,

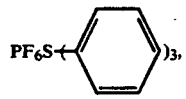

etc.

(3) Useful protonic acids include organic protonic acids such as methanesulfonic acid, ethanesulfonic acid, trifluoromethanesulfonic acid, benzenesulfonic acid, p-toluenesulfonic acid and the like, and inorganic protonic acids such as phosphoric acid, phosphorus acid, phosphinic acid, phosphonic acid, sulfuric acid, perchloric acid and the like.

(4) Useful compound having Si—O—Al bond or bonds, for example include aluminum silicate.

Among the curing catalysts described above, a metal chelate compound is preferred because it can form a coating composition having a high curability.

A suitable amount of each curing catalyst described above in items (1) to (3) is about 0.01 to about 30 parts by weight per 100 parts by weight of the resin in the curable coating composition, calculated as solids. Less than about 0.01 part by weight of the catalyst is likely to decrease the curability, whereas over about 30 parts thereof tends to remain in the cured product and to reduce the water resistance, hence undesirable. A preferred amount of the catalyst is about 0.1 to about 10 parts by weight, more preferably about 1 to about 5 parts by weight.

A suitable amount of the curing catalyst stated above in (4) is about 1 to about 100 parts by weight per 100 parts by weight of the resin in the curable coating composition, calculated as solids. The amount less than the range tends to reduce the curability, whereas the amount above the range tends to impair the properties of the coating film, hence undesirable.

When required, the clear coating composition of the invention may contain the following components.

(1) Hydroxyl-containing resins and hydroxyl-containing compounds (2) Carboxyl-containing resins and carboxyl-containing compounds (3) Silane-containing resins and silane-containing compounds (4) Epoxy-containing resins and epoxy-containing compounds (5) Chelate compounds (capable of improving the storage stability)

(6) Organic solvents (7) Pigments (insofar as they do not inhibit transparency)

(8) Additive resins (such as cellulose acetate butylate, etc.) or compounds (9) Polyepoxy compounds Useful pigments can be inorganic or organic. Inorganic pigments useful in the invention include oxide-type pigments such as titanium dioxide, red iron oxide, chromium oxide and the like; hydroxide-type pigments such as alumina white and the like; sulfate-type pigments such as precipitated barium sulfate and the like; carbonate-type pigments such as precipitated calcium carbonate and the like; sulfate-type pigments such as clay and the like; carbon-type pigments such as carbon black and the like; and metallic powders such as aluminium powders, bronze powders, zinc powders and the like. Organic pigments useful in the invention include azo-type pigments such as lake red, first yellow and the like; and phthalocyanine-type pigments such as phthalocyanine blue and the like.

The clear coating composition to be used in the invention comprises the resin (Y) or the resin mixture (Z) as the basal resin and the curing catalyst as main components, and is capable of forming a transparent coating film. The composition is dispersed or dissolved in an organic solvent and/or water.

3. Coating method

The coating method of the invention has the feature of applying and curing the aqueous base coat composition and the clear coating composition by the two-coat one-bake system.

Suitable substrates to be coated by the coating method of the invention include the body panels of motor vehicles, buses, tracks, motor bikes or the like and outer panels of electrical appliances or like articles which must have aesthetic appearance. The materials of substrates to be coated are not limited to metals, but include plastics, inorganic materials, etc. When required, before use these substrates may be subjected to the conventional chemical treatment or coated with an intercoating composition or an electrophoretic coating composition. Useful electrophorectic coating compositions can be any of known cationic electrophoretic coating compositions among which suitable are those capable of forming a flat film of up to 20 μm dry thickness and adapted to form a single layer coating film.

First, the aqueous base coat composition is applied to the substrate. The composition can be applied by air spray coaters, airless spray coaters, air atomizing-type or rotary electrostatic coating devices or the like. The coating composition to be applied is preferably adjusted to about 800 to about 5,000 cps/6 rpm (B-type viscometer) and is applied to form a coating film having a thickness of about 10 to about 50 μm, preferably about 15 to about 30 μm when cured with heating.

Subsequently the aqueous base coat composition is air dried at a temperature ranging from room temperature to about 100° C. without curing by crosslinking until the water content of the coating film is reduced to up to about 30 wt. %, preferably up to about 15 wt. %. Then the clear top coating composition is applied to the coated surface.

The clear coating composition can be applied by suitable coaters selected from the examples given above for the aqueous base coat composition. A preferred film thickness of the clear coating is about 10 to about 80 μm (when cured). After application of the clear coating composition, the two coatings applied in superposition are cured preferably by heating at about 60° to about 170° C. for about 10 to about 90 minutes.

Because of its aqueous form, the base coat composition of the invention contributes to savings in resources and prevention of pollution, can be safely handled and is economical. Further the aqueous base coat composition can improve the orientation of the aluminum pigment or like scaly metallic pigment.

According to the invention, the specific curable clear coating composition is applied to the coated surface of the base coat composition, whereby the following remarkable results can be produced.

1. The composition gives a coating film excellent in surface smoothness and distinctness-of-image gloss. Since ionic polymerization reaction and addition reaction predominantly occur during the curing reaction, only small amounts of by-products are formed so that the resulting coating film involves a low volumetric shrinkage in the curing process and has an excellent surface smoothness without minute surface irregularities (orange peel). Therefore, the clear coating applied in superimposition is very satisfactory in distinctness-of-image gloss.

2. The composition is highly curable at low temperatures. A suitable crosslinking reaction occurs by baking at a temperature of about 80° C. for 30 to 40 minutes.

Therefore, the composition of this invention can be used for plastic substrates which are not suited to bake at a temperature of 120° C. or higher.

3. The clear coating composition of this invention is used in a one-package form and thus is stable and less toxic.

4. The clear coating composition of the invention can be readily made into a superhigh solids composition.

5. Coating films excellent in acid resistance can be obtained.

The coating film formed is completely free from spots, loss of gloss, etching and like problems which would be caused by acid rain.

6. Coating films excellent in stain resistance can be obtained.

The coating film formed is highly resistant to pollutants because of the high crosslinking density and water repellency due to the polysiloxane groups present in the basal resin.

7. The coating film formed is highly scratch-resistant because of the synergistic effects of the high crosslinking density and the reduction of frictional resistance due to the polysiloxane in the basal resin.

8. The coating film formed is highly weather-resistant (namely, free of loss of gloss, cracking, chalking and blistering). This characteristic is imparted to the coating due to the following phenomena. Since there concurrently occur ion polymerization of epoxy groups, addition reaction of epoxy groups with silanol and hydroxyl groups and condensation reaction of silanol groups, substantially no portion of the coating remains uncured because of little difference of curability between the surface and the interior of the coating which is attributable to only small amounts of by-products produced in the curing reaction.

The present invention will be described below in greater detail with reference to the following Preparation Examples, Examples and Comparison Examples in which the parts and the percentages are all by weight.

I. Preparation of coating composition (1) A core/shell emulsion was prepared using the monomers shown below in Table 1 by executing the following steps.

Step (I): A flask was charged with 120 parts of deionized water, which was then heated to 80° to 85° C. Two parts of the first pre-emulsion shown in Table 1 was added dropwise with stirring. After the mixture was aged for 20 minutes, the remaining portion of the first pre-emulsion was added dropwise at a constant rate and at the same temperature over a period of 3 hours, giving an aqueous dispersion of three-dimensionally crosslinked particulate polymer as a core.

Step (II): A silane monomer and allyl methacrylate were added dropwise to the aqueous dispersion upon completion of addition of the first pre-emulsion. The mixture was maintained at 80° to 85° C. for 1 hour to react the silane monomer and allyl methacrylate on the surface of the core.

Step (III): Fifty parts of deionized water was added and the second pre-emulsion was added dropwise at a constant rate at 80° to 85° C. over a period of 1 hour.

The mixture was maintained at the same temperature for 1 hour and rapidly cooled to room temperature after which deionized water was added to provide a solids content of 30%. The thus obtained particulate polymer was insoluble in an organic solvent. Then deionized water was added and the mixture was neutralized with diethanolamine and adjusted to a 20% solids content, producing core/shell emulsions EM-1 to EM-6.

TABLE 1

|  | Preparation Examples | | | | | |
|---|---|---|---|---|---|---|
|  | EM-1 | EM-2 | EM-3 | EM-4 | EM-5 | EM-6 |
| First Pre-emulsion (*1) | | | | | | |
| Step (I) | | | | | | |
| γ-Methacryloxypropyl trimethoxy silane | 2 | 4 |  | 2 | 4 |  |
| Vinyl trimethoxy silane |  |  | 2 |  |  | 2 |
| Styrene | 20 | 20 | 20 | 20 | 20 | 20 |
| Methyl methacrylate | 20 | 23 | 25 | 23 | 20 | 23 |
| Butyl acrylate | 43 | 43 | 40 | 40 | 43 | 45 |
| Hydroxypropyl methacrylate | 15 | 10 | 13 | 15 | 13 | 10 |
| Ammonium salt of polyoxyethylene nonylphenyl ether sulfate | 1.5 | 1.5 | 1.5 | 1.5 | 1.5 | 1.5 |
| Ammonium persulfate | 0.4 | 0.4 | 0.4 | 0.4 | 0.4 | 0.4 |
| Deionized water | 45 | 45 | 45 | 45 | 45 | 45 |
| Step (II) | | | | | | |
| γ-Methacryloxypropyl trimethoxy silane | 2 | 4 |  | 2 | 2 | 2 |
| Vinyl trimethoxy silane |  |  | 2 |  |  |  |
| Allyl methacrylate | 2 | 2 | 3 | 2 | 2 | 2 |
| Second Pre-emulsion (*1) | | | | | | |
| Step (III) | | | | | | |
| Acrylic acid | 16 |  | 18 | 16 | 16 |  |
| Methacrylic acid |  | 16 |  |  |  | 20 |
| Styrene | 12 | 12 | 12 | 12 | 12 | 12 |
| Methyl methacrylate | 20 | 18 | 18 | 24 | 22 | 16 |
| Butyl acrylate | 44 | 44 | 40 | 40 | 40 | 40 |
| Hydroxyethyl acrylate | 8 | 10 | 12 | 8 | 10 | 12 |
| Ammonium salt of polyoxyethylene nonylphenyl ether sulfate | 0.3 | 0.3 | 0.3 | 0.3 | 0.3 | 0.3 |
| Ammonium persulfate | 0.2 | 0.2 | 0.2 | 0.2 | 0.2 | 0.2 |
| Deionized water | 12 | 12 | 12 | 12 | 12 | 12 |
| First Pre-emulsion/ Second Pre-emulsion (Weight ratio of monomers) (*2) | 80/20 | 80/20 | 80/20 | 70/30 | 80/20 | 90/10 |
| Before neutralization | | | | | | |
| Particle size (nm) (*4) | 121 | 131 | 130 | 110 | 135 | 103 |
| pH | 2.3 | 2.4 | 2.2 | 2.6 | 2.8 | 2.5 |

TABLE 1-continued

|  | Preparation Examples | | | | | |
| --- | --- | --- | --- | --- | --- | --- |
|  | EM-1 | EM-2 | EM-3 | EM-4 | EM-5 | EM-6 |
| After neutralization (*3) | | | | | | |
| Particle size (nm) (*4) | 124 | 132 | 135 | 118 | 138 | 110 |
| pH | 7.5 | 7.5 | 7.5 | 7.5 | 7.5 | 7.5 |

The symbols *1 to *4 used in Table 1 designate the following.
(*1) Pre-emulsion: An emulsion prepared by uniformly dispersing the mixture of the listed components by a high-speed stirrer.
(*2) Ratio by weight of polymerizable monomers contained in each pre-emulsion
(*3) Diethanolamine was used for neutralization.
(*4) Measured by laser spectroscopy method

(2) Preparation of core/shell emulsion (EM-7)

A reactor was charged with 140 parts of deionized water, 2.5 parts of 30% "Newcol 707SF" (surfactant, product of Nippon Hyukazai Co., Ltd.) and 1 part of a monomer mixture (1) given below. The mixture was stirred in a nitrogen stream, followed by addition of 3 parts of 3% ammonium persulfate at 60° C. The resulting mixture was heated to 80° C. A monomer emulsion comprising 79 parts of the monomer mixture (1), 2.5 parts of 30% "Newcol 707 SF", 4 parts of 3% ammonium persulfate and 42 parts of deionized water was thereafter placed into the reactor by a metering pump over a period of 4 hours. After completion of the addition, the mixture was aged for 1 hour.

At 80° C., 20.5 parts of a monomer mixture (2) and 4 parts of 3% aqueous solution of ammonium persulfate were concurrently placed dropwise into the reactor over a period of 1.5 hours. After completion of the addition, the resulting mixture was aged for 1 hour, then diluted with 30 parts of deionized water and filtered with 200-mesh nylon cloth at 30° C. Deionized water was added to the filtrate, and the pH of the mixture was adjusted to a pH of 7.5 with diethanolamine, giving a core/shell emulsion (EM-7) containing particles with a mean particle size of 0.1 μm and having a nonvolatile content of 20%.

| Monomer mixture (1) | |
| --- | --- |
| Methyl methacrylate | 55 parts |
| Styrene | 8 parts |
| n-Butyl acrylate | 10 parts |
| 2-Hydroxyethyl acrylate | 5 parts |
| 1,6-Hexanediol diacrylate | 2 parts |
| Methacrylic acid | 1 part |
| Monomer mixture (2) | |
| Methyl methacrylate | 5 parts |
| n-Butyl acrylate | 7 parts |
| 2-Ethylhexyl acrylate | 5 parts |
| Methacrylic acid | 3 parts |
| 30% "Newcol 707SF" | 0.5 part |

(3) Preparation of core/shell emulsion (EM-8)

The same procedure as in the preparation of the emulsion (EM-7) was conducted with the exception of using a monomer mixture (3) given below in place of the monomer mixture (1) used in the preparation of the emulsion (EM-7). The procedure gave a core/shell emulsion (EM-8) containing resin particles of 0.1 μm in mean particle size and having a nonvolatile content of 20%.

| Monomer mixture (3) | |
| --- | --- |
| Methyl methacrylate | 52.5 parts |
| Styrene | 10 parts |
| n-Butyl acrylate | 9 parts |
| 2-Hydroxyethyl acrylate | 5 parts |
| Allyl methacrylate | 2.5 parts |
| Methacrylic acid | 1 part |

(4) Preparation of aqueous dispersion of hydrophobic melamine resin (EM-9)

A hydrophobic melamine resin A (to be detailed below) was placed into a stirring container in an amount to provide a solids content of 25 parts. Twenty parts of aqueous solution of acrylic resin (to be detailed below) was added. Then the mixture was stirred by a stirrer operated at 1,000 to 1,500 rpm while 88.75 parts of deionized water was gradually added. Thereafter stirring was further continued for 30 minutes so that the hydrophobic melamine resin particles were coated with the water-soluble acrylic resin, giving an aqueous dispersion of a crosslinking agent in the form of particles 0.11 μm in mean particle size.

(5) Preparation of hydrophobic melamine resin A

A 2 l four-necked flask equipped with a thermometer, a stirrer and a reflux condenser was charged with 126 parts of melamine, 225 parts of 80% p-formalin (product of Mitsui Toatsu Chemicals Inc.) and 592 parts of n-butanol. The mixture was adjusted to a pH of 9.5 to 10.0 with a 10% aqueous solution of sodium hydroxide, and reacted at 80° C. for 1 hour.

Then 888 parts of n-butanol was added. The mixture was adjusted to a pH of 5.5 to 6.0 with a 5% aqueous solution of sulfuric acid and reacted at 80° C. for 3 hours. After completion of the reaction, the reaction mixture was neutralized to a pH of 7 to 7.5 with a 20% aqueous solution of sodium hydroxide and was concentrated under reduced pressure at 60° to 70° C. by removal of the n-butanol. The concentrate was filtered to obtain a melamine resin A.

The analysis of the obtained resin showed that the resin had a nonvolatile content of 80%, a solvent dilution ratio of 3.6 given using a water/methanol solvent mixture (ratio by weight of 35/65) (hereinafter simply referred to as "solvent dilution ratio"), and a weight-average molecular weight of 800.

(6) Preparation of aqueous solution of acrylic resin

A reactor was charged with 60 parts of butyl cellosolve and 15 parts of isobutyl alcohol. The mixture was heated to 115° C. in a nitrogen stream. After the temperature reached 115°, there was added over a 3-hour period a mixture of 26 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile. After addition, the mixture was aged at 115° C. for 30 minutes. A mixture of 1 part of azobisisobutyronitrile and 115 parts of butyl cellosolve was added over a 1-hour period. After aging for 30 minutes, the mixture was filtered through 200-mesh nylon cloth at 50° C.

The obtained reaction product had an acid value of 48 and a viscosity of $Z_4$ (Gardner-bubble viscometer), and a nonvolatile content of 5%. The product was neutralized with diethanolamine to an equivalent and deionized water was added, producing a 50% aqueous solution of acrylic resin.

(7) Preparation of aqueous dispersion of hydrophobic melamine resin (EM-10)

The same procedure as in the preparation of EM-9 was repeated with the exception of using a commercially available hydrophobic melamine resin B ("Super-beckamin L-127-75B", product of Dainippon Ink and Chemicals, Inc., nonvolatile content of 80%, solvent dilution ratio of 0.5, and weight-average molecular weight of 1,400 to 1,800) in place of the hydrophobic melamine resin A used in the preparation of EM-9, giving an aqueous dispersion of a crosslinking agent EM-10 in the form of particles 0.12 μm in mean particle size.

(8) Preparation of concentrated dispersion of aluminum pigment

A stirring container was charged with 23 parts of aluminum paste (65% metal content) and 25 parts of butyl cellosolve. The mixture was stirred for 1 hour, providing a concentrated dispersion of aluminum pigment (P-1).

(9) Preparation of pigment-containing aqueous base coat composition (AB)

An aqueous coating composition (AB) for forming a base coat was prepared using the emulsions, melamine resins and pigment dispersions obtained in above Preparation Examples.

The formulation of the aqueous coating compositions (AB-1 to AB-13) is shown below in Table 2.

Aqueous coating compositions (AB-1) to (AB-13) were prepared by homogeneously mixing and dispersing the components and adding 2.9 to 2.1 parts of "Acrysol ASE-60" (trademark for a thickener manufactured by Rohm and Haas Co.) and 0.27 to 0.20 part of diethanolamine to adjust the mixture to an apparent viscosity of 3,000 cps/6 rpm (Brookfield viscometer) and a pH of 7.80. In Table 2, "aqueous solution" appearing under the column of basal resin is an aqueous solution of acrylic resin used above in the preparation of the aqueous dispersion (EM-9).

TABLE 2

| | Basal resin | | Curing agent | | Pigment concentrate | |
|---|---|---|---|---|---|---|
| | Kind | Amount | Kind | Amount | Kind | Amount |
| AB-1 | EM-1 | 356 | EM-9 | 112 | P-1 | 42 |
| AB-2 | EM-2 | 356 | EM-9 | 112 | P-1 | 54 |
| AB-3 | EM-3 | 320 | EM-9 | 140 | P-1 | 42 |
| AB-4 | EM-4 | 320 | EM-9 | 140 | P-1 | 54 |
| AB-5 | EM-5 | 284 | EM-9 | 168 | P-1 | 42 |
| AB-6 | EM-6 | 284 | EM-9 | 168 | P-1 | 54 |
| AB-7 | EM-7 | 274 | EM-9 | 118 | P-1 | 42 |
| AB-8 | EM-8 | 227 | EM-9 | 134 | P-1 | 42 |
| AB-9 | EM-8 Aqueous solution | 300 7 | EM-9 | 140 | P-1 | 42 |
| AB-10 | EM-7 Aqueous solution | 255 7 | EM-10 | 118 | P-1 | 54 |

TABLE 2-continued

| | Basal resin | | Curing agent | | Pigment concentrate | |
|---|---|---|---|---|---|---|
| | Kind | Amount | Kind | Amount | Kind | Amount |
| AB-11 | EM-4 Aqueous solution | 255 7 | EM-13 | 118 | P-1 | 54 |
| AB-12 | EM-5 Aqueous solution | 255 1 | EM-13 | 134 | P-1 | 54 |
| AB-13 | EM-6 Aqueous solution | 200 1 | EM-13 | 145 | P-1 | 54 |

(10) Preparation of resin (Y-1)

| | |
|---|---|
| Polysiloxane macromonomer (A) | 300 g |
| Glycidyl methacrylate | 100 g |
| Styrene | 100 g |
| n-Butyl methacrylate | 500 g |
| Azobisisobutylnitrile | 30 g |

The above mixture was added dropwise to 1,000 g of xylene at 120° C. and polymerized to give a transparent copolymer. The copolymer obtained had a number-average molecular weight of about 18,000.

(11) Preparation of polysiloxane macromonomer (A)

| | |
|---|---|
| Methyltrimethoxysilane | 2720 g (20 mol) |
| γ-Methacryloxypropyl-trimethoxy silane | 256 g (1 mole) |
| Deionized water | 1134 g |
| 6% Hydrochloric acid | 2 g |
| Hydroquinone | 1 g |

The above mixture was reacted at 80° C. for 5 hours. The obtained polysiloxane macromonomer had a number-average molecular weight of 2,000 and an average of one vinyl group (polymerizable unsaturated bond) and 4 hydroxyl groups per molecule.

(12) Preparation of resin (Y-2)

| | |
|---|---|
| Polysiloxane macromonomer (A) | 100 g |
| 2-Hydroxyethyl acrylate | 100 g |
| $CH_2{=}C(CH_3){-}C({=}O){-}O{-}CH_2{-}\text{cyclohexene oxide}$ | 200 g |
| 2-Ethylhexyl methacrylate | 500 g |
| Styrene | 100 g |
| Azobisisobutylnitrile | 50 g |

The above mixture was added dropwise to 1,000 g of a 1:1 (w/w) mixture of butanol and xylene and the mixture was polymerized at 120° C. to give a transparent copolymer. The obtained copolymer had a number-average molecular weight of about 10,000.

(13) Preparation of resin (Y-3)

| | |
|---|---|
| Polysiloxane macromonomer (A) | 150 g |
| 2-Hydroxyethyl acrylate | 100 g |

(13) Preparation of resin (Y-3)

| | |
|---|---|
| $CH_2=C(CH_3)-C(O)-O-CH_2-\text{(cyclohexene oxide)}$ | 150 g |
| n-Butyl acrylate | 500 g |
| Styrene | 100 g |
| Azobisisobutylnitrile | 10 g |

The above mixture was polymerized in the same manner as in the preparation of the resin (Y-2). The transparent copolymer obtained had a number-average molecular weight of about 30,000.

(14) Preparation of resin (Y-4)

| | |
|---|---|
| Polysiloxane macromonomer (A) | 150 g |
| 2-Hydroxyethyl acrylate | 100 g |
| $CH_2=CH-C(O)-O-CH_2-CH_2-OCNH-\text{(2-methylphenylene)}-NHCOCH_2-\text{(cyclohexene oxide)}$ | 150 g |
| n-Butyl acrylate | 500 g |
| Styrene | 100 g |
| Azobisisobutylnitrile | 30 g |

The above mixture was polymerized in the same manner as in the preparation of the resin (Y-2). The transparent copolymer obtained had a number-average molecular weight of about 19,000.

(15) Preparation of resin (Z-1-1)

| | |
|---|---|
| Polysiloxane macromonomer (A) | 600 g |
| n-Butyl acrylate | 300 g |
| Styrene | 100 g |
| Azobisisobutylnitrile | 30 g |

The above mixture was polymerized in the same manner as in the preparation of the resin (Y-1). The copolymer obtained had a number-average molecular weight of about 18,000.

(16) Preparation of resin (Z-2-1)

| | |
|---|---|
| Glycidyl methacrylate | 200 g |
| n-Butyl acrylate | 700 g |
| Styrene | 100 g |
| Azobisisobutylnitrile | 30 g |

The above mixture was polymerized in the same manner as in the preparation of the resin (Y-1). The copolymer obtained had a number-average molecular weight of about 18,000.

(17) Preparation of resin (Z-1-2)

| | |
|---|---|
| Polysiloxane macromonomer (A) | 200 g |
| 2-Ethylhexyl acrylate | 700 g |
| 2-Hydroxyethyl acrylate | 100 g |
| Azobisisobutylnitrile | 50 g |

The above mixture was polymerized in the same manner as in the preparation of the (Y-2). The copolymer obtained had a number-average molecular weight of about 10,000.

(18) Preparation of resin (Z-2-2)

| | |
|---|---|
| $CH_2=C(CH_3)-C(O)-O-CH_2-\text{(cyclohexene oxide)}$ | 400 g |
| 2-Ethylhexyl acrylate | 500 g |
| 2-Hydroxyethyl acrylate | 100 g |
| Azobisisobutylnitrile | 30 g |

The above mixture was polymerized in the same manner as in the preparation of the resin (Y-2). The transparent copolymer obtained had a number-average molecular weight of about 17,000.

(19) Preparation of resin (Z-2-3)

The same procedure as above gave a 50% xylol solution of acrylic resin having a number-average molecular weight of about 20,000 and comprising:

| | |
|---|---|
| Glycidyl methacrylate | 14.2 parts |
| n-Butyl methacrylate | 44.2 parts |
| 2-Hydroxyethyl acrylate | 11.6 parts |
| Styrene | 30.0 parts |

(20) Preparation of resin (Z-1-3)

The same procedure as above gave a 50% xylol solution of an acrylic resin having a number-average molecular weight of 20,000 and comprising:

| | |
|---|---|
| γ-Methacryloxypropyl trimethoxy silane | 23.6 parts |
| n-Butyl methacrylate | 46.4 parts |
| Styrene | 30.0 parts |

(21) Preparation of resin (Y-5)

An acrylic resin having a number-average molecular weight of 70,000 and comprising a mixture given below as made into a 60% solution with addition of a 1:1 mixture of toluol/isobutyl acetate.

| | |
|---|---|
| 3,4-epoxycyclohexyl methyl methacrylate | 20.0 parts |
| Polysiloxane macromonomer (A) | 20.0 parts |
| 2-Hydroxyethyl methacrylate | 13.0 parts |
| n-Butyl methacrylate | 47.0 parts |

(22) Preparation of resin (Y-6)

69
-continued

| | |
|---|---|
| 2-Hydroxyethyl methacrylate | 26.0 parts |
| Acrylic acid | 7.2 parts |
| Methyl methacrylate | 66.8 parts |

There was obtained a 50% toluol solution of an addition reaction of an acrylic resin (a number-average molecular weight of 40,000) comprising the above mixture with 15 parts of a compound Q of the formula below and 10 parts of a compound R of the formula below.

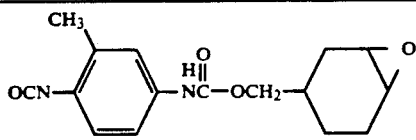

Compound Q

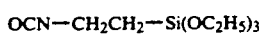

OCN—CH$_2$CH$_2$—Si(OC$_2$H$_5$)$_3$   Compound R

(23) Preparation of resin (Y-7)

| | |
|---|---|
| CH$_2$=CHCOOC$_2$H$_4$OH | 20 parts by wt. |
| 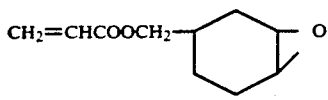 | 30 parts by wt. |
| 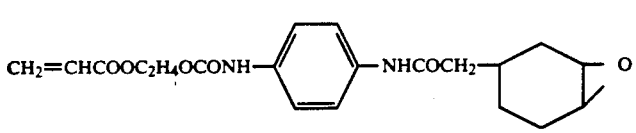 | 10 parts by wt. |
| CH$_2$=C(CH$_3$)COOC$_3$H$_6$Si(OCH$_3$)$_3$ | 10 parts by wt. |
| CH$_2$=C(CH$_3$)COOC$_4$H$_9$ | 30 parts by wt. |

The above mixture was subjected to radical polymerization in 100 parts by weight of xylene in the presence of azobisisobutyronitrile at 90° C. for 3 hours, giving a solution of copolymer having a nonvolatile content of 50 wt % and a number-average molecular weight of 6,000.

(24) Preparation of resin (Z-1-4)

| | |
|---|---|
| FM-3* monomer | 30 parts by weight |
| Macromonomer (B) | 30 parts by weight |
| CH$_2$=CHCOOC$_2$H$_4$C$_8$F$_{17}$ | 10 parts by weight |
| CH$_2$=C(CH$_3$)COOC$_4$H$_9$ | 30 parts by weight |

Note: FM-3* is a trade name for a hydroxyl-containing caprolactone-modified ester of methacrylic acid having an average-molecular weight of 472 and a theoretical hydroxyl value of 119 KOH mg/g, product of Daicel Chemical Co., Ltd.

The above mixture was reacted under the same conditions as those for preparation of the resin (Y-7), giving a solution of a copolymer having a nonvolatile content of 50 wt. % and a number-average molecular weight of 5,000.

(25) Preparation of Macromonomer (B)

| | |
|---|---|
| 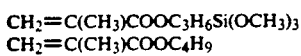 | 7,800 g |
| CH$_2$=CHCOOC$_3$H$_6$Si(OCH$_3$)$_3$ | 200 g |
| Toluene | 4,500 g |

70

The above mixture was reacted at 117° C. for 3 hours, followed by dehydration. The obtained polysiloxane macromonomer had a number-average molecular weight of 7,000 and contained an average of one vinyl group and 5 to 10 silanol groups per molecule.

(26) Preparation of resin (Z-2-4)

| | |
|---|---|
| CH$_2$=C(CH$_3$)COOC$_2$H$_4$OH | 15 parts by weight |
| CH$_2$=C(CH$_3$)COOCH$_2$CH——CH$_2$ \_O/ | 40 parts by weight |
| 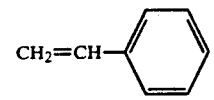 | 20 parts by weight |
| CH$_2$=C(CH$_3$)COOC$_4$H$_9$ | 25 parts by weight |

The above mixture was reacted under the same conditions as those for preparation of the resin (Y-7), giving a copolymer having a nonvolatile content of 50 wt. % and a number-average molecular weight of 10,500.

(27) Preparation of resin (Y-8)

| | |
|---|---|
| CH$_2$=CHCOOC$_2$H$_4$OH | 30 parts by weight |
| 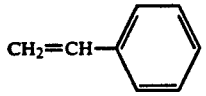 | 20 parts by weight |
| CH$_2$=C(CH$_3$)COOC$_4$H$_9$ | 50 parts by weight |

The above mixtures was reacted under the same conditions as those for preparation of the resin (Y-7), giving a copolymer (1) having a nonvolatile content of 50% and a number-average molecular weight of 5,000.

A 400 ml-vol. glass flask equipped with a stirrer was charged with the following mixture:

| | |
|---|---|
| Solution of copolymer (1) (nonvolatile content 50%) | 200 parts by weight |
| (CH₃COO)₃SiC₃H₆NCO | 10 parts by weight |
| 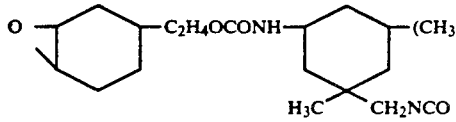 | 30 parts by weight |
| Xylene | 40 parts by weight |

The mixture was stirred at 100° C. for 5 hours to undergo an addition reaction of —OH group and —NCO group. Then it was confirmed that the NCO value reduced to 0.001 or less. The reaction gave a copolymer containing groups —OH, —Si(OCOCH₃)₃ and

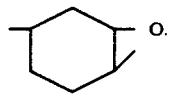

(28) Preparation of resin (Y-9)

| | |
|---|---|
| CH₂=C(CH₃)COOC₃H₆Si(OCH₃)₃ | 20 parts by weight |
| CH₂=C(CH₃)COOC₂H₄NCO | 37 parts by weight |
| 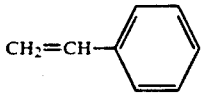 | 10 parts by weight |
| CH₂=C(CH₃)COOC₄H₉ | 33 parts by weight |

The above mixture was reacted under the same conditions as those for the preparation of resin (Y-7), giving a copolymer (2) having a nonvolatile content of 50 wt. % and a number-average molecular weight of 6,200.

A 400 ml-vol. glass flask equipped with a stirrer was charged with the following mixture:

| | |
|---|---|
| Solution of copolymer 2 (nonvolatile content 50%) | 200 parts by weight |
| 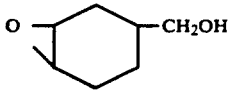 | 30 parts by weight |
| Xylene | 30 parts by weight |

The mixture was stirred at 100° C. for 5 hours to undergo an addition reaction of —OH group and —NCO group. Then it was confirmed that the NCO value reduced to 0.001 or less. The reaction gave a copolymer containing groups

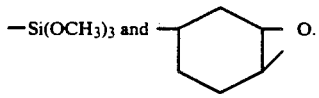

(29) Preparation of resin (Z-1-5)

| | |
|---|---|
| CH₂=CHCOOH | 5 parts by weight |
| 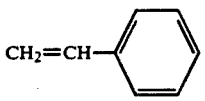 | 30 parts by weight |
| CH₂=C(CH₃)COOC₄H₉ | 65 parts by weight |

The above mixture was reacted under the same conditions as those for the preparation of resin (Y-7), giving a solution of a copolymer (3) having a nonvolatile content of 50 wt. % and a number-average molecular weight of 5,800.

A 400 ml-vol. glass flask equipped with a stirrer was charged with the following mixture:

| | |
|---|---|
| Solution of copolymer (3) (nonvolatile content 50%) | 200 parts by weight |
|  | 14.3 parts by weight |
| Tetramethylammonium bromide | 0.1 part by weight |
| Xylene | 14.3 parts by weight |

The mixture was reacted at 110° C. for 6 hours with stirring to adduct the group —COOH to the group

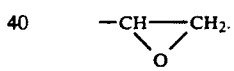

Then it was confirmed that the acid value reduced to 0.01 or lower. The reaction gave a copolymer having a group —Si(OCH₃)₃.

(30) Preparation of resin (Z-2-5)

A 400 ml-vol. autoclave of stainless steel equipped with a stirrer was charged with the following monomers:

| | |
|---|---|
| CH₂=CH—O—C₄H₈OH | 10 parts by weight |
| CH₂=CH—O—C₂H₅ | 5 parts by weight |
| 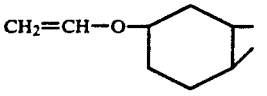 | 40 parts by weight |
| and | |
| Methyl isobutyl ketone | 200 parts by weight |
| Azobisisobutyronitrile | 2 parts by weight |
| Sodium borate | 0.5 part by weight |

After replacement with nitrogen, and solidification by cooling and deaeration, 45 parts by weight of a compound CF₂=CFCl was placed into the autoclave wherein the temperature was gradually elevated to 60°

C. The mixture was reacted with stirring for 16 hours or longer. When the internal pressure in the autoclave was reduced to 1 kg/cm² or lower, the autoclave was cooled with water to terminate the reaction. The obtained resin solution was added to an excess amount of heptane to precipitate the resin. The precipitate was washed and dried, giving 91 g of resin in a yield of 91%.

The obtained resin was 6,300 in number-average molecular weight. The resin was dissolved in an equal amount of xylene to obtain a resin solution having a nonvolatile content of 50 wt. %.

(31) Preparation of resin (Z-2-6)

The same procedure as in preparation of the resin (Z-2-5) was repeated with the exception of using the following monomers in place of the monomers for the resin (Z-2-5), giving a solution of a copolymer having a nonvolatile content of 50 wt. % and a number-average molecular weight of 7,200.

| | |
|---|---|
| CH₂=CHOCOCH₃ | 10 parts by weight |
| CH₂=CHOCOC₃H₇ | 10 parts by weight |
| CF₂=CFCl | 40 parts by weight |

(32) Preparation of resin (Z-1-6)

The same procedure as for preparation of the resin (Z-2-5) was repeated with the exception of using the following monomers in place of the monomers for the resin (Z-2-5), giving a solution of a copolymer having a nonvolatile content of 50 wt. % and a number-average molecular weight of 6,800.

| | |
|---|---|
| CH₂=CHSi(OH)(OCH₃)₂ | 20 parts by weight |

10 parts by weight

| | |
|---|---|
| CH₂=CHOC₂H₅ | 15 parts by weight |
| CF₂=CFCl | 45 parts by weight |
| CF₂=CF₂ | 10 parts by weight |

(33) Preparation of resin (Y-10)

A 400 ml-vol. glass flask equipped with a stirrer was charged with the following mixture:

| | |
|---|---|
| Solution of resin (Z-2-5) (nonvolatile content 50%) | 200 parts by weight |
| (CH₃CO)₂Si—C₃H₆SH<br>\|<br>CH₃ | 30 parts by weight |
| Xylene | 30 parts by weight |

The mixture was reacted with stirring at 96° C. for 9 hours. From the disappearance of absorption of —SH group in infrared absorption spectrum, it was confirmed that the reaction gave a copolymer having introduced therein the groups —OH, epoxy group and a group —Si(CH₃)(OCOCH₃)₂.

(34) Preparation of clear coating composition (C) for forming transparent coating film A clear coating composition (C) was prepared using as a basal resin the resin obtained in the above Preparation Examples.

The formulation of the clear coating composition (C) is as shown below in Table 3.

In Table 3, the amounts (part by weight) are all in terms of solids content, and the resin (Z-1-7) is represented by

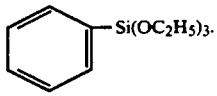

Among the curing catalysts used, A=tris-(acetylacetone)aluminum, B=tetrakis(acetylacetone)-zirconium and C=diisopropoxybis(acetylacetone)-titanium. The mark D is used under the column of "Other" to stand for a compound represented by the formula

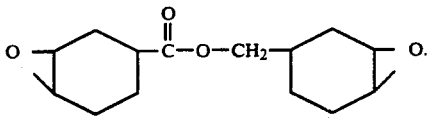

TABLE 3

| | Basal resin | | Curing catalyst | | Other | |
|---|---|---|---|---|---|---|
| | Kind | Amount | Kind | Amount | Kind | Amount |
| C-1 | (Y-1) | 100 | A | 2 | D | 30 |
| C-2 | (Y-2) | 100 | B | 2 | | |
| C-3 | (Y-3) | 100 | C | 2 | | |
| C-4 | (Y-4) | 100 | A | 2 | | |
| C-5 | (Z-1-1) | 50 | A | 2 | D | 30 |
| | (Z-2-1) | 50 | | | | |
| C-6 | (Z-1-2) | 50 | A | 1.5 | | |
| | (Z-2-2) | 50 | | | | |
| C-7 | (Z-1-3) | 50 | A | 1 | D | 30 |
| | (Z-2-3) | 50 | | | | |
| C-8 | (Y-5) | 100 | B | 1 | | |
| C-9 | (Y-6) | 100 | C | 1.5 | | |
| C-10 | (Y-7) | 100 | A | 2 | | |
| C-11 | (Z-1-4) | 50 | A | 2 | D | 30 |
| | (Z-2-6) | 50 | | | | |
| C-12 | (Z-1-7) | 25 | A | 2 | D | 25 |
| | (Z-2-4) | 50 | | | | |
| C-13 | (Y-8) | 100 | A | 2 | | |
| C-14 | (Y-9) | 60 | B | 2 | | |
| | (Z-2-5) | 40 | | | | |
| C-15 | (Z-1-5) | 40 | C | 2 | D | 20 |
| | (Z-2-6) | 60 | | | | |
| C-16 | (Z-1-6) | 50 | A | 2 | D | 20 |
| | (Z-2-6) | 50 | | | | |

II. Examples

The aqueous base coat compositions (AB) and the clear top coating compositions (C) prepared in the above Preparation Examples were applied to test pieces by the two-coat one-bake method.

A steel plate (7.5×15×0.2 cm) surface-treated with "Bonderite #3030 (zinc phosphate treating agent, product of Nihon Parkerrizing Co., Ltd.) was coated with "Elecron No. 9200" (cationic electrophoretic coating composition of the epoxy resin type, product of Kansai Paint Co., Ltd.), and was further coated with "Amilac N-2 Sealer" (intercoat composition of the amino resin/polyester resin type, product of Kansai Paint Co., Ltd.).

First, deionized water was added to the aqueous coating composition (AB) serving as a base coat composition to give a solids content of 20%. The mixture was adjusted to a viscosity of 2,000 to 3,000 cps/rpm (B-type viscometer) with a thickener and was applied by an electrostatic spray coating device at 25° C. and a relative humidity of 70%. The resulting coating film had a 15 to 20 μm thickness on dry basis. After heating the coating film at room temperature to up to 100° C. to give a water content of not higher than 10 wt. %, the clear top coating composition (C) adjusted to a viscosity of 22 seconds (Ford cup No. 4/20° C.) with Swasol #1000 (petroleum type solvent mixture, product of Cosmo Oil Co., Ltd.) was applied to the base coat by an air spray coater to a dry film thickness of 40 to 50 μm. The coating film was allowed to stand for 10 minutes at room temperature and baked at 140° C. for 30 minutes.

III. Results of performance tests

Table 4 shows the kinds of the aqueous base coating compositions (AB) and clear coating compositions (C) used in the tests and the results of performance tests.

The tests were conducted by the following methods.

Surface smoothness

The surface of tests coated panels was observed with the unaided eye to evaluate the surface smoothness thereof according to the following criteria:
A: Excellent
B: Unsatisfactory in surface smoothness
C: Poor in surface smoothness

Gloss

The gloss was evaluated in terms of 60 deg. specular reflectivity.

Distinctness-of-image gloss

The distinctness-of-image gloss was measured with an image clarity meter (manufactured by Suga Tester Co., Ltd.). The values in the table represent ICM values which vary from 0 to 100%. The larger the ICM value, the higher the distinctness-of-image gloss. The ICM value not less than 80 represents a very high distinctness-of-image gloss. Sagging:

To check sagging, the substrate with a hole, 1 cm in diameter, was placed upright. The base coat composition and the clear coating composition were applied to the substrate in the same manner as above and cured at relative humidities of 70% and 90%. The length (mm) of portion of the applied composition sagging downward from the hole was measured. Mottling:

The substrate was coated with metallic coating in the same manner as in the sagging test. The coated substrate was observed to check the metallic mottling. The mark A represents no or little mottling, the mark B a high degree of mottling, and the mark C a significant degree of mottling. Adhesion:

The coated substrate was cut crosswise with a cutter knife to the substrate so that parallel cuts are provided in a checkboard-like pattern with a spacing of 1 mm between adjacent cuts to produce 100 squares (each 1 cm²). An adhesive cellophane tape was adhered to the cut coating surface, and the tape was peeled off with a strong force to evaluate the adhesiveness. The mark A represents no peeling, the mark B a little peeling between the metallic coating and the clear top coating and the mark C a marked degree of peeling between the coatings. Impact resistance:

The impact resistance of the test coated panel was determined using a Du Pont impact tester (½ inch radius of impact load element, 500 g weight). The impact resistance was assessed in terms of the maximum height (cm) at which the dropping of the weight caused no cracking on the coating surface. Chipping resistance:

A gravel impact testing machine (product of Suga Tester K.K., "JA-400" model) was used. A test piece coated with the composition was held in a vertical position by a test piece holder in the tester. Crushed stones (No. 7, 50 g) were forced out at an air pressure of 4 kg/cm² applied by the tester to cause the stones to clash against the test piece at an angle of 90° C. Thereafter the test piece was washed with water and dried. The film pieces afforded by chipping were removed from the test piece with an adhesive tape. Thereafter the degree of chipping was evaluated according to the following ratings.

|  | Size of peeling of top coat | Number of peelings* |
| --- | --- | --- |
| 1. | No peel occured in coating except for a slight scratching | |
| 2. | 0.5 mm or less | 10 or less |
| 3. | 0.5 to 1.0 mm | 20 to 40 |
| 4. | 1.0 to 2.0 mm | 30 to 60 |
| 5. | 1.5 to 3.0 mm | 50 to 80 |

(Note: *"Number of peelings*" denotes the number of peelings caused in a square area of 3 cm in each side)

The test coated panel was immersed for 5 to 10 minutes in a dry ice/methanol mixture cooled to −25° C. Upon withdrawal (within a few seconds), the coated panel was subjected to the chipping resistance test by the foregoing method. The coated panel was maintained at a temperature of −20°±5° C. during the test. Scratch resistance:

The scratch resistance was determined using a tester for color fastness of dyed materials against friction (product of Daiei Kagakuseiki Seisakusho). A polishing power ("Daruma Cleanser", trademark) was kneaded with water to a high viscosity and the resulting mass was placed on the coating surface. While pressed with a terminal element of the tester, the coating surface was rubbed under a load of 0.5 kg to achieve 35 reciprocating strokes. After the coated substrate was washed with water, the degree of scratching was evaluated according to the following ratings:
A: Slightly scratched
B: Moderately scratched
C: Densely scratched

Pencil hardness

The coating surface was scratched with a pencil "Mitsubishi Uni" (tradename for pencils manufacture by Mitsubishi Pencil Co., Ltd.) while pressed with the pencil lead. The degree of pencil hardness was evaluated and expressed in common symbols for hardness such as H, 2H or B to represent a maximum hardness of lead which caused no mar on the surface. Xylol resistance:

The coating surface was vigorously rubbed with a piece of xylol-impregnated gauze pressed against the surface with fingers to achieve 20 reciprocal strokes. The results were evaluated in terms of the degrees of dissolution, mar and swelling and rated according to the following criteria.
A: Not changed
B: Slightly changed
C: Greatly changed Acid resistance The test coated panel was immersed in 40% $H_2SO_4$ at 40° C. for 10 hours, withdrawn and washed with water after which the acid resistance was evaluated according to the following criteria:
A: No change
B: Slight loss of gloss
C: Significant loss of gloss and blistering Weatherability Using an accelerated weathering tester (manufactured by Q Panel Co., Ltd.), a QUV accelerated exposure test was carried out under conditions of one cycle comprising:

| UV irradiation | 16 hr/60° C. |
|---|---|
| water condensation | 9 hr/50° C. |

After conducting 150 cycles (3600 hours), the weatherability was evaluated according to the following ratings.

A: Substantially the same gloss as in initial stage.
B: Slightly reduced gloss but free of cracking, blushing and the like.
C: Significantly reduced gloss and marked cracking and chalking, hence unacceptable.

Water resistance

The test coated panel was immersed in a water bath at 40° C. for 10 days. After withdrawal, the water resistance of the test coated panel was evaluated according to the following ratings:
A: No change
B: Blistered
C: Significantly blistered Humidity resistance Using a wetting tester (product of Suga Tester K.K.), a test coated panel was placed into a chamber maintained at a temperature of 49°±1° C. and a relative humidity of 98% and was left to stand for 240 hours.

On withdrawal from the chamber, the waterdrops were wiped away from the coated panel. The coating on the panel was checked to evaluate the undesired change such as blistering, shrinkage and the like, comparing the coated panel before testing. The mark A represents non-occurrence of change and the mark B a slight degree of blistering, shrinkage and/or the like.

In Table 4, "C-17" used in Comparative Example 1 is an organic solvent-diluted acrylic resin/melamine resin type thermosetting clear coating composition.

TABLE 4

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| | Aqueous coating composition (AB) | | | | | | | | | | |
| | AB-1 | AB-2 | AB-3 | AB-4 | AB-5 | AB-6 | AB-7 | AB-8 | AB-9 | AB-10 | AB-11 |
| | Clear coating composition (C) | | | | | | | | | | |
| Film properties | C-1 | C-1 | C-1 | C-1 | C-2 | C-3 | C-4 | C-5 | C-6 | C-7 | C-8 |
| Surface smoothness | A | A | A | A | A | A | A | A | A | A | A |
| Gloss | 96 | 96 | 95 | 96 | 95 | 95 | 95 | 95 | 96 | 96 | 96 |
| Destinctness-of-image gloss | 89 | 89 | 88 | 89 | 88 | 87 | 88 | 89 | 89 | 88 | 88 |
| Sagging | | | | | | | | | | | |
| 70% | 1.0 | 0.9 | 1.1 | 1.0 | 1.2 | 1.1 | 1.1 | 1.1 | 1.2 | 1.0 | 0.9 |
| 90% | 2.1 | 2.3 | 2.2 | 2.3 | 2.1 | 2.3 | 2.2 | 2.1 | 2.3 | 2.1 | 2.1 |
| Mottling | | | | | | | | | | | |
| 70% | A | A | A | A | A | A | A | A | A | A | A |
| 90% | A | A | A | A | A | A | A | A | A | A | A |
| Adhesion | A | A | A | A | A | A | A | A | A | A | A |
| Impact resistance | 45 | 45 | 45 | 45 | 45 | 45 | 50< | 50< | 50< | 45 | 50< |
| Chipping resistance | 3 | 3 | 3 | 3 | 3 | 3 | 2 | 1 | 2 | 3 | 1 |
| Scratch resistance | A | A | A | A | A | A | A | A | A | A | A |
| Pencil hardness | H | H | H | H | H | H | H | H | H | H | H |
| Xylol resistance | A | A | A | A | A | A | A | A | A | A | A |
| Acid resistance | A | A | A | A | A | A | A | A | A | A | A |
| Weatherability | A | A | A | A | A | A | A | A | A | A | A |
| Water resistance | A | A | A | A | A | A | A | A | A | A | A |
| Humidity resistance | A | A | A | A | A | A | A | A | A | A | A |

| | Example | | | | | | | | Comp. Ex. |
|---|---|---|---|---|---|---|---|---|---|
| | 12 | 13 | 14 | 15 | 16 | 17 | 18 | 19 | 1 |
| | Aqueous coating composition (AB) | | | | | | | | |
| | AB-12 | AB-13 | AB-1 | AB-2 | AB-3 | AB-4 | AB-5 | AB-6 | AB-1 |
| | Clear coating composition (C) | | | | | | | | |
| Film properties | C-9 | C-10 | C-11 | C-12 | C-13 | C-14 | C-15 | C-16 | C-17 |
| Surface smoothness | A | A | A | A | A | A | A | A | A |
| Gloss | 95 | 96 | 96 | 95 | 96 | 95 | 95 | 96 | 95 |
| Destinctness-of-image gloss | 87 | 88 | 88 | 89 | 87 | 88 | 88 | 88 | 71 |
| Sagging | | | | | | | | | |
| 70% | 0.9 | 1.2 | 1.1 | 1.0 | 1.0 | 1.1 | 1.0 | 1.2 | 0.8 |
| 90% | 2.2 | 2.1 | 2.2 | 2.2 | 2.2 | 2.1 | 2.3 | 2.2 | 1.0 |
| Mottling | | | | | | | | | |
| 70% | A | A | A | A | A | A | A | A | A |
| 90% | A | A | A | A | A | A | A | A | A |

TABLE 4-continued

| | | | | | | | | | |
|---|---|---|---|---|---|---|---|---|---|
| Adhesion | A | A | A | A | A | A | A | A | A |
| Impact resistance | 50< | 50< | 50< | 50< | 50< | 50< | 50< | 50< | 45 |
| Chipping resistance | 1 | 1 | 2 | 2 | 1 | 1 | 1 | 1 | 3 |
| Scratch resistance | A | A | A | A | A | A | A | A | C |
| Pencil hardness | H | H | H | H | H | H | H | H | H |
| Xylol resistance | A | A | A | A | A | A | A | A | A |
| Acid resistance | A | A | A | A | A | A | A | A | C |
| Weatherability | A | A | A | A | A | A | A | A | B |
| Water resistance | A | A | A | A | A | A | A | A | A |
| Humidity resistance | A | A | A | A | A | A | A | A | A |

We claim:
1. A coating method comprising the steps of:
providing a base coat composition, the base coat composition comprising an aqueous acrylic resin, an amino resin as a crosslinking agent, a pigment and water;
providing a clear top coat composition comprising a metal chelate compound as a curing catalyst, a solvent and a resin which comprises
a) a first vinyl polymer containing an epoxy group, a hydroxyl group and a silicon atom having directly attached thereto at least one member of the group consisting of hydroxyl and a hydrolyzable group, or
b) a mixture of a second vinyl polymer containing an epoxy group and a third vinyl polymer containing a silicon atom having directly attached thereto at least one member of the group consisting of hydroxyl and a hydrolyzable group, wherein one of the second polymer and the third polymer contain a hydroxyl group;
applying the base coat composition to a substrate to form a base coat layer;
applying the top coat composition to the base coat layer to form a top coat layer thereon; and
simultaneously curing the base coat layer and the top coat layer.

2. A coating method according to claim 1 wherein the first vinyl polymer is a copolymer resulting from the reaction of an epoxy-containing polymerizable unsaturated monomer, hydroxyl-containing polymerizable unsaturated monomer and a silane-containing polymerizable unsaturated monomer, said silane containing polymerizable unsaturated monomer having a hydroxyl group and/or hydrolyzable group directly attached to the silicon atom.

3. A coating method according to claim 1 wherein the second vinyl polymer is a polymer resulting from the reaction of an epoxy-containing polymerizable unsaturated monomer, or the epoxy-containing monomer and a hydroxyl-containing polymerizable unsaturated monomer.

4. A coating method according to claim 1 wherein the third vinyl polymer is a polymer resulting from the reaction of a silane-containing polymerizable monomer, or the silane-containing polymerizable monomer and a hydroxyl-containing polymerizable monomer, said silane-containing polymerizable monomer having a hydroxyl group and/or hydrolyzable group directly attached to the silicon atom.

5. A coating method according to claim 1 wherein the curing catalyst is present in an amount of about 0.01 to about 30 parts by weight per 100 parts by weight, calculated as solids, of the resin present in the top coat composition.

* * * * *